US012775106B2

(12) United States Patent
Li et al.

(10) Patent No.: US 12,775,106 B2
(45) Date of Patent: Oct. 27, 2026

(54) DETECTION SUBSTRATE AND FLAT PANEL DETECTOR

(71) Applicants: Beijing BOE Sensor Technology Co., Ltd., Beijing (CN); BOE Technology Group Co., Ltd., Beijing (CN)

(72) Inventors: Jinyu Li, Beijing (CN); Guan Zhang, Beijing (CN); Haibo Yu, Beijing (CN); Xuecheng Hou, Beijing (CN); Fengchun Pang, Beijing (CN)

(73) Assignees: Beijing BOE Sensor Technology Co., Ltd., Beijing (CN); Beijing BOE Technology Development Co., Ltd., Beijing (CN)

(*) Notice: Subject to any disclaimer, the term of this patent is extended or adjusted under 35 U.S.C. 154(b) by 337 days.

(21) Appl. No.: 18/706,165

(22) PCT Filed: Apr. 27, 2023

(86) PCT No.: PCT/CN2023/091353
§ 371 (c)(1),
(2) Date: Apr. 30, 2024

(87) PCT Pub. No.: WO2023/208149
PCT Pub. Date: Nov. 2, 2023

(65) Prior Publication Data

US 2026/0140269 A1 May 21, 2026

(30) Foreign Application Priority Data

Apr. 28, 2022 (WO) ................ PCT/CN2022/089699

(51) Int. Cl.
*G01T 1/24* (2006.01)

(52) U.S. Cl.
CPC .................................... *G01T 1/241* (2013.01)

(58) Field of Classification Search
None
See application file for complete search history.

(56) References Cited

U.S. PATENT DOCUMENTS

| | | | |
|---|---|---|---|
| 5,572,257 | A | 11/1996 | Conrads et al. |
| 6,185,274 | B1 | 2/2001 | Kinno et al. |

(Continued)

FOREIGN PATENT DOCUMENTS

| | | | |
|---|---|---|---|
| CN | 1574375 | A | 2/2005 |
| CN | 1969387 | A | 5/2007 |

(Continued)

OTHER PUBLICATIONS

Liu et al, CN 102157533, Amorphous Silicon Imaging Sensor with Storage Capacitance Structure, Aug. 17, 2011 (Year: 2017).*

(Continued)

*Primary Examiner* — Alexander G Ghyka
(74) *Attorney, Agent, or Firm* — Workman Nydegger

(57) ABSTRACT

A detection substrate and a flat panel detector. The detection substrate includes a group of pixel units distributed in an array, each pixel unit including a thin-film transistor, a photoelectric conversion device, a first bias voltage line and a compensation capacitor. A bottom electrode of the photoelectric conversion device is electrically connected to a source electrode of the thin-film transistor, and the first bias voltage line is electrically connected to a top electrode of the photoelectric conversion device. The compensation capacitor includes: a bottom electrode, a dielectric layer, and a compensation electrode. In a peripheral area, the detection substrate includes: a group of first conductive layers and a second bias voltage line. A first conductive layer is electrically connected to a column of compensation electrodes, the second bias voltage line is electrically connected to the first bias voltage line and the first conductive layer.

20 Claims, 17 Drawing Sheets

(56) References Cited

U.S. PATENT DOCUMENTS

| | | | | |
|---|---|---|---|---|
| 2005/0231656 | A1* | 10/2005 | den Boer | H04N 25/30 257/E27.132 |
| 2007/0146282 | A1* | 6/2007 | Choo | G09G 3/3659 345/98 |
| 2008/0302969 | A1* | 12/2008 | Jung | H10D 86/00 257/59 |
| 2010/0302419 | A1* | 12/2010 | Den Boer | H04N 25/30 348/294 |
| 2017/0278909 | A1* | 9/2017 | Jeon | A61B 5/6898 |
| 2019/0187300 | A1* | 6/2019 | Kim | G01T 1/20184 |
| 2020/0064497 | A1* | 2/2020 | Wu | G01T 1/241 |
| 2022/0278146 | A1* | 9/2022 | Hou | H10D 86/00 |

FOREIGN PATENT DOCUMENTS

| | | | |
|---|---|---|---|
| CN | 101166998 | A | 4/2008 |
| CN | 102157533 | A | 8/2011 |
| CN | 102306653 | A | 1/2012 |
| CN | 106169484 | A | 11/2016 |
| CN | 108476294 | A | 8/2018 |
| CN | 109830563 | A | 5/2019 |
| CN | 110854147 | A | 2/2020 |
| CN | 111653581 | A | 9/2020 |
| CN | 113406832 | A | 9/2021 |
| DE | 4118154 | A1 | 12/1992 |
| EP | 0523784 | A1 | 1/1993 |
| JP | 2006208753 | A | 8/2006 |
| KR | 101843284 | B1 | 3/2018 |

OTHER PUBLICATIONS

U.S. Non-Final Office Action, Mailed Feb. 14, 2025, from U.S. Appl. No. 18/025,200, 30 pages.

* cited by examiner

DETECTION SUBSTRATE AND FLAT PANEL DETECTOR

CROSS REFERENCE TO RELATED APPLICATIONS

The application is a US National Stage of International Application No. PCT/CN2023/091353, filed on Apr. 27, 2023, which claims priority to International Application No. PCT/CN2022/089699 filed on Apr. 28, 2022, and entitled "PHOTOELECTRIC DETECTOR AND ELECTRONIC DEVICE", the entire content of which is incorporated herein by reference.

TECHNICAL FIELD

The disclosure relates to the technical field of photoelectric detection, in particular to a detection substrate and a flat panel detector.

BACKGROUND

A flat X-ray panel detector (FPXD) manufactured based on thin film transistor technology is a vital component in digital imaging technology, and is widely applied to fields such as medical images (such as chest X-rays), industrial detection (such as metal defect detection), security detection, and air transport due to its advantages such as fast imaging speed, a good spatial resolution and density resolution, a high signal to noise ratio, and direct digital output.

The flat X-ray panel detector mainly includes thin film transistors and photoelectric conversion devices. Under X-ray irradiation, an indirect-conversion flat X-ray panel detector converts X-ray photons into visible light by a scintillator layer or a phosphor layer, then converts the visible light into electric signals under the action of the photoelectric conversion devices, finally reads the electric signals through the thin film transistors and outputs the electric signals to obtain a display image.

SUMMARY

Embodiments of the disclosure provide a detection substrate and a flat panel detector. Specific solutions are as follows.

Embodiments of the disclosure provide a detection substrate, including a base substrate with a detection area and a peripheral area outside the detection area, and the detection area includes a plurality of pixel units distributed in an array. Each pixel unit includes: a thin film transistor at a side of the base substrate; a photoelectric conversion device at a side of the thin film transistor facing away from the base substrate, where a bottom electrode of the photoelectric conversion device is electrically connected with a source electrode of the thin film transistor; a first bias voltage line at a side of the photoelectric conversion device facing away from the base substrate, where the first bias voltage line is electrically connected with a top electrode of the photoelectric conversion device; and a compensation capacitor, including: the bottom electrode, a dielectric layer at a side of the bottom electrode facing the base substrate, and a compensation electrode at a side of the dielectric layer facing the base substrate. In the peripheral area, the detection substrate includes: a plurality of first conductive layers arranged in the same layer as the compensation electrode, and a second bias voltage line arranged in the same layer as the first bias voltage line. At least one first conductive layer is electrically connected with at least one column of compensation electrodes, the second bias voltage line is electrically connected with the first bias voltage line, and the first conductive layer is electrically connected with the second bias voltage line.

In a possible implementation, in the above detection substrate provided by the embodiment of the disclosure, in the peripheral area, the detection substrate further includes a plurality of spaced second conductive layers between the first conductive layer and the second bias voltage line. The second conductive layers are arranged in the same layer as the bottom electrode; and the first conductive layers are electrically connected with the second bias voltage line through the second conductive layers.

In a possible implementation, in the above detection substrate provided by the embodiment of the disclosure, a column of compensation electrodes are correspondingly provided with at least one first conductive layer and at least one second conductive layer. A first overlapping area is provided between the first conductive layer, the second conductive layer and the second bias voltage line, and the first overlapping area includes at least one via area. The first conductive layer is electrically connected with the second conductive layer through the at least one via area, and the second conductive layer is electrically connected with the second bias voltage line through the at least one via area.

In a possible implementation, the above detection substrate provided by the embodiment of the disclosure further includes: an interlayer insulating layer between the thin film transistor and the photoelectric conversion device; a planarization layer between the photoelectric conversion device and the first bias voltage line; and a first passivation layer between the planarization layer and the first bias voltage line. Each via area includes at least one first via passing through the interlayer insulating layer, at least one second via passing through the first passivation layer, and at least one third via passing through the planarization layer. In the same via area, an orthographic projection of the second via on the base substrate is located within a scope of an orthographic projection of the third via on the base substrate, the first conductive layer is electrically connected with the second conductive layer through the first via, and the second conductive layer is electrically connected with the second bias voltage line through the second via and the third via.

In a possible implementation, the above detection substrate provided by the embodiment of the disclosure further includes: a second passivation layer between the photoelectric conversion device and the planarization layer. The second vias pass through the second passivation layer and the first passivation layer.

In a possible implementation, the above detection substrate provided by the embodiment of the disclosure further includes a shielding layer at a side of the first bias voltage line facing away from the base substrate, and a third passivation layer between the first bias voltage line and the shielding layer. The shielding layer covers the first overlapping area, each via area further includes at least one fourth via passing through the third passivation layer, and the shielding layer is electrically connected with the second bias voltage line through the fourth via.

In a possible implementation, in the above detection substrate provided by the embodiment of the disclosure, in the same via area, an orthographic projection of the first via on the base substrate is located within the scope of the orthographic projection of the third via on the base substrate. The first via and the second via are alternately arranged in an extension direction of the first overlapping area, and the orthographic projection of the third via on the base substrate is located within a scope of an orthographic projection of the fourth via on the base substrate.

In a possible implementation, in the above detection substrate provided by the embodiment of the disclosure, an aperture of the first via is larger than an aperture of the second via.

In a possible implementation, in the above detection substrate provided by the embodiment of the disclosure, in the same via area, the orthographic projection of the first via on the base substrate does not overlap with the orthographic projection of the third via on the base substrate, and the orthographic projection of the fourth via on the base substrate does not overlap with the orthographic projection of the third via on the base substrate.

In a possible implementation, in the above detection substrate provided by the embodiment of the disclosure, the first vias, the second vias and the fourth vias all are arranged in an array.

In a possible implementation, in the above detection substrate provided by the embodiment of the disclosure, the first overlapping area further includes a transmitting area spaced from the via area, the transmitting area includes a first through hole passing through the first conductive layer, a second through hole passing through the second conductive layers and a third through hole passing through the second bias voltage line. The first through hole, the second through hole and the third through hole are sleeve holes.

In a possible implementation, in the above detection substrate provided by the embodiment of the disclosure, areas of orthographic projection of the first through hole, the second through hole and the third through hole on the base substrate decrease successively.

In a possible implementation, in the above detection substrate provided by the embodiment of the disclosure, the via area and the transmitting area are alternately arranged.

In a possible implementation, in the above detection substrate provided by the embodiment of the disclosure, the thin film transistor includes a gate electrode, a gate insulating layer, an active layer, a source electrode and a drain electrode arranged in stack, the compensation electrode is arranged in the same layer as the source electrode, and the dielectric layer is the interlayer insulating layer.

In a possible implementation, in the above detection substrate provided by the embodiment of the disclosure, the thin film transistor includes a gate electrode, a gate insulating layer, an active layer, a source electrode and a drain electrode arranged in a laminated mode, the compensation electrode is arranged in the same layer as the gate electrode, and the dielectric layer includes the interlayer insulating layer and the gate insulating layer.

In a possible implementation, in the above detection substrate provided by the embodiment of the disclosure, the detection area further includes first signal lines and second signal lines insulated and intersecting with each other, each second signal line is electrically connected with drain electrodes of the thin film transistors in two adjacent columns of pixel units, and gate electrodes of the thin film transistors in each row of pixel units are electrically connected with either of the two first signal lines at two sides of the row of pixel units alternately. Two columns of compensation electrodes between every two adjacent second signal lines are in a group, and a compensation line is arranged at a gap between two corresponding adjacent columns of pixel units in each group. The compensation line extends to the peripheral area, and the compensation line is arranged in the same layer as the compensation electrodes at the two sides of the compensation line and is electrically connected with the compensation electrodes at the two sides of the compensation line; and each group of compensation electrodes correspond to two first conductive layers.

In a possible implementation, in the above detection substrate provided by the embodiment of the disclosure, the first via further passes through the gate insulating layer.

In a possible implementation, in the above detection substrate provided by the embodiment of the disclosure, the detection area further includes first signal lines and second signal lines insulated and intersecting with each other, each second signal line is electrically connected with drain electrodes of the thin film transistors in a column of pixel units, and each first signal line is electrically connected with gate electrodes of the thin film transistors in a row of pixel units. The plurality of compensation electrodes arranged in an arrangement direction of the via areas are connected in series successively, and the first conductive layer is electrically connected with the compensation electrode closest to the first conductive layer among the compensation electrodes connected in series.

In a possible implementation, in the above detection substrate provided by the embodiment of the disclosure, the first signal lines or the second signal lines extend to the peripheral area, an overlapping area between orthographic projections of the second bias voltage line and the first signal line or the second signal line on the base substrate has a plurality of first hollow-out structures arranged in intervals, and an overlapping area between orthographic projections of the shielding layer with the first signal line or the second signal line on the base substrate has a plurality of second hollow-out structures arranged in intervals.

In a possible implementation, in the above detection substrate provided by the embodiment of the disclosure, an orthographic projection of the first hollow-out structure on the base substrate partially overlaps with an orthographic projection of the second hollow-out structure on the base substrate.

In a possible implementation, in the above detection substrate provided by the embodiment of the disclosure, a ratio of a width of the first overlapping area to a width of the pixel unit ranges from 50% to 75%, and a length of the first overlapping area is 2-6 times of a length of the pixel unit.

In a possible implementation, in the above detection substrate provided by the embodiment of the disclosure, at a position where the first bias voltage line is connected with the second bias voltage line, a width of the second bias voltage line is larger than a width of the first bias voltage line.

In a possible implementation, in the above detection substrate provided by the embodiment of the disclosure, at a position where the first conductive layer is connected with the compensation electrode, a width of the first conductive layer is larger than a width of the compensation electrode.

In a possible implementation, in the above detection substrate provided by the embodiment of the disclosure, an orthographic projection of the first bias voltage line on the base substrate mutually overlaps with an orthographic projection of the pixel unit on the base substrate.

In a possible implementation, in the above detection substrate provided by the embodiment of the disclosure, an orthographic projection of the first bias voltage line on the base substrate is located between an orthographic projection of the pixel unit on the base substrate and an orthographic projection of the second signal line on the base substrate.

Accordingly, an embodiment of the disclosure further provides a flat panel detector, including any one of the above detection substrate provided by the embodiment of the disclosure.

DETAILED DESCRIPTION

Figure 1:
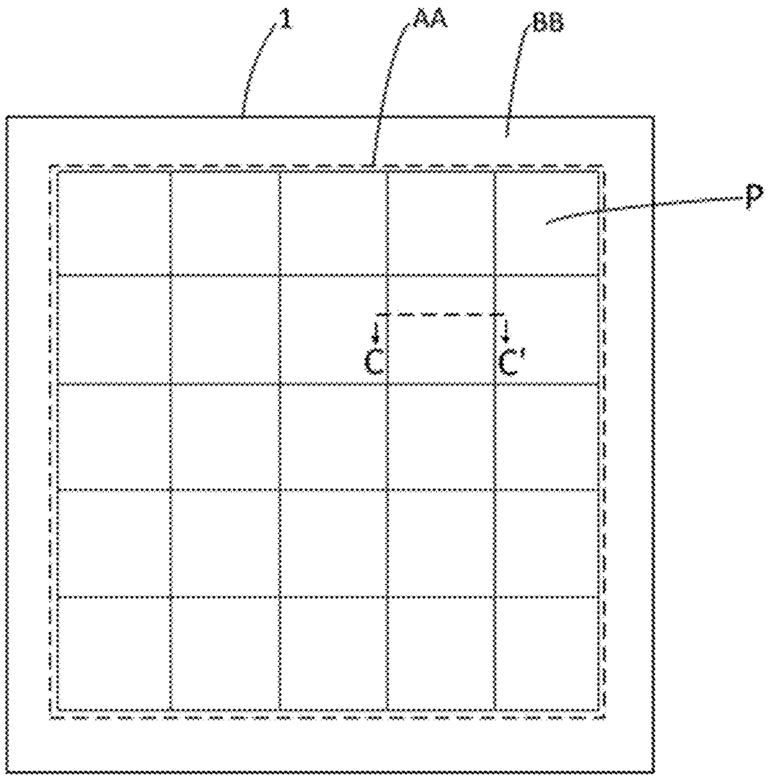
FIG. 1 shows a schematic planar diagram of a detection substrate provided by the disclosure.

In order to make the objectives, technical solutions and advantages of embodiments of the disclosure clearer, the technical solutions of the embodiments of the disclosure will be described clearly and completely with reference to accompanying drawings of the embodiments of the disclosure. Apparently, the described embodiments are part of the embodiments of the disclosure, not all of them. The embodiments in the disclosure and features in the embodiments may be combined with each other in the case of no conflict. On the basis of the described embodiments of the disclosure, all other embodiments obtained by those ordinarily skilled in the art without creative labor fall within the scope of protection of the disclosure.

Unless otherwise defined, technical or scientific terms used in the disclosure shall have the usual meanings understood by those ordinarily skilled in the art to which the disclosure pertains. "Including" or "containing" and similar words used in the disclosure mean that an element or item preceding the word covers an element or item listed after the word and the equivalent thereof, without excluding other elements or items. "Connection" or "coupling" and similar words are not limited to a physical or mechanical connection, but may include an electrical connection, whether direct or indirect. "Inner", "outer", "upper", "lower" and the like are merely used to represent a relative position relationship, and the relative position relationship may be possibly accordingly changed after an absolute position of a described object is changed.

It needs to be noted that sizes and shapes of all figures in the accompanying drawings do not reflect true scales, and are only intended to schematically illustrate the content of the disclosure. The same or similar reference numerals represent the same or similar elements or elements with the same or similar functions all the time.

With the continuous progress of a semiconductor manufacturing process and the increasing requirement for an image resolution, a size of a pixel unit of a flat panel detector is gradually decreased. However, for pixel units with small sizes, it is inevitable to reduce an active area of a photoelectric conversation device, reduce capacitance on the photoelectric conversation device, and reduce the charge storage capacity between an upper electrode and a lower electrode of the photoelectric conversation device, finally resulting in a problem of a low dynamic range of an output signal of a flat panel detector in an actual using process, which severely limits the ability to display details of collected images.

Figure 2:
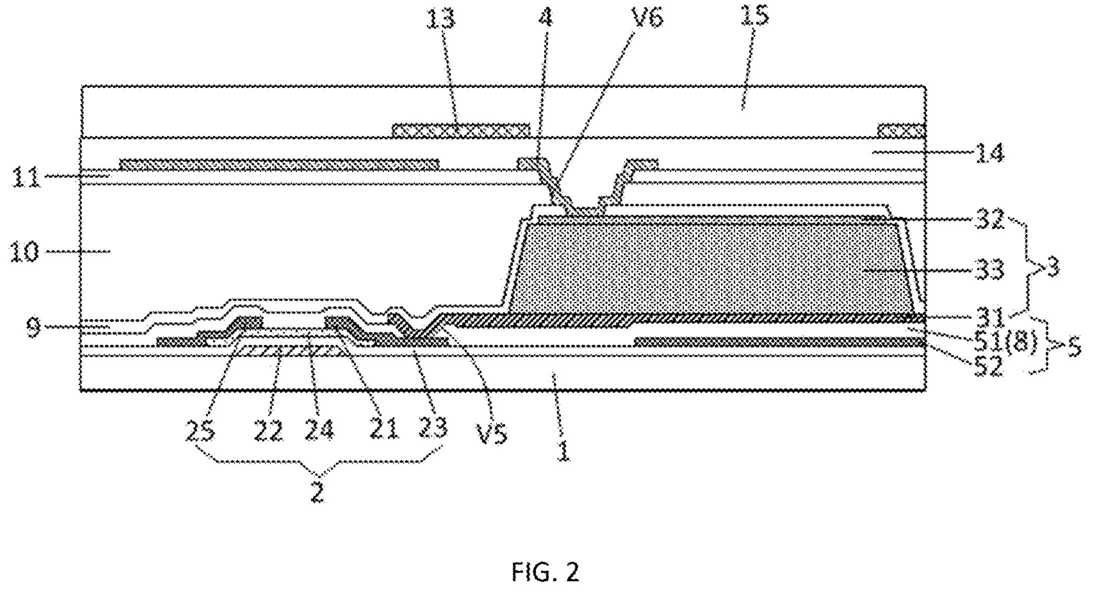
FIG. 2 shows a sectional view along a direction CC' in FIG. 1.
Figure 3:
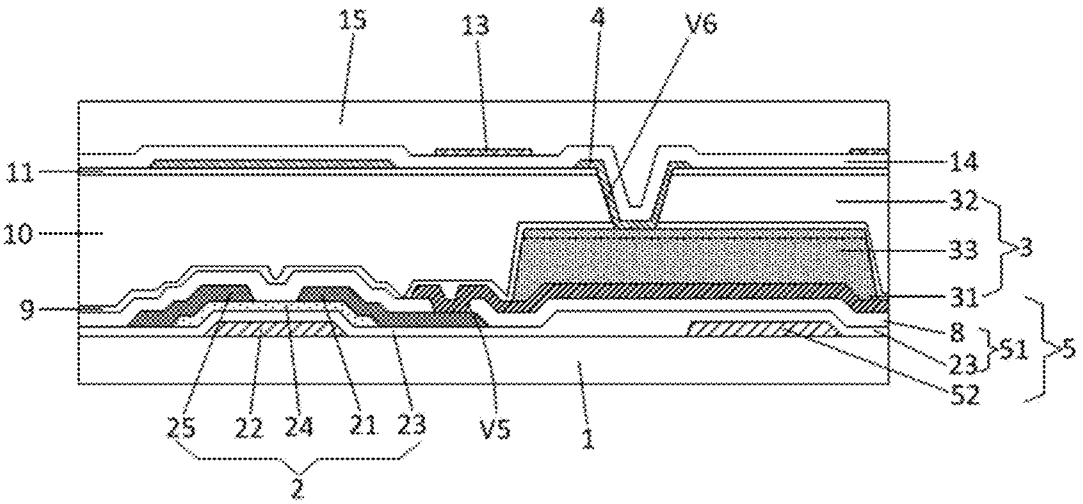
FIG. 3 shows yet another sectional view along a direction CC' in FIG. 1.
Figure 4:
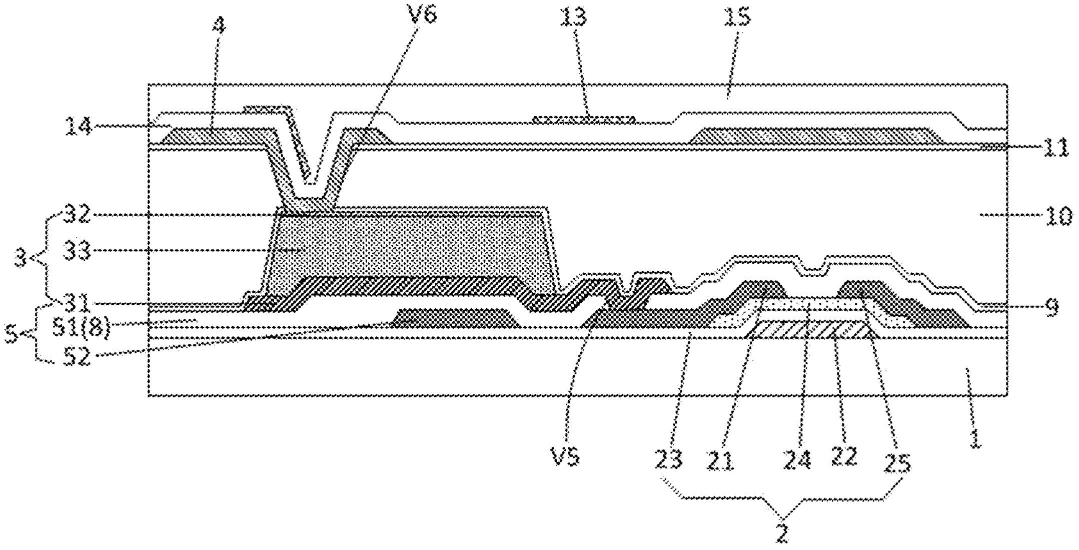
FIG. 4 shows yet another sectional view along a direction CC' in FIG. 1.

In order to solve the above problem, the disclosure provides a detection substrate. As shown in FIG. 1, the detection substrate includes a base substrate 1, the base substrate 1 has a detection area AA and a peripheral area BB outside the detection area AA, and the detection area AA includes a plurality of pixel units P distributed in an array. As shown in FIG. 2 to FIG. 4, FIG. 2 is a sectional view along a direction CC' in FIG. 1, FIG. 3 is yet another sectional view along a direction CC' in FIG. 1, and FIG. 4 is yet another sectional view along a direction CC' in FIG. 1. Each pixel unit includes:

a thin film transistor 2 at a side of the base substrate 1;

a photoelectric conversion device 3 at a side of the thin film transistor 2 facing away from the base substrate 1, where a bottom electrode 31 of the photoelectric conversion device 3 is electrically connected with a source electrode 21 of the thin film transistor 2;

a first bias voltage line 4 at a side of the photoelectric conversion device 3 facing away from the base substrate 1, where the first bias voltage line 4 is electrically connected with a top electrode 32 of the photoelectric conversion device 3; and a compensation capacitor 5 including: the bottom electrode 31, a dielectric layer 51 at a side of the bottom electrode 31 facing the base substrate 1, and a compensation electrode 52 at a side of the dielectric layer 51 facing the base substrate 1.

As shown in FIG. 5 to FIG. 8, several schematic planar diagrams of a detection substrate are shown. In the peripheral area BB, the detection substrate includes: a plurality of first conductive layers 6 arranged in the same layer as the compensation electrode 52, and a second bias voltage line 7 arranged in the same layer as the first bias voltage line 4. At least one first conductive layer 6 is electrically connected with at least one column of compensation electrodes 52, the second bias voltage line 7 is electrically connected with the first bias voltage line 4, and the first conductive line 6 is electrically connected with the second bias voltage line 7.

In the above detection substrate provided by the embodiment of the disclosure, the compensation capacitor having a bottom electrode shared with the photoelectric conversion device is formed in the pixel unit, so that it is equivalent that the compensation capacitor is in parallel connection with a storage capacitor formed by a top electrode and the bottom electrode of the photoelectric conversion device, to thereby increase the capacitance of the photoelectric conversion device. Therefore, without losing the resolution, the disclosure can increase the charge storage capacity of the pixel units, and improve the dynamic range of the output signal of the flat panel detector. In addition, the compensation electrode of the compensation capacitor is electrically connected with the first bias voltage line not in the pixel unit, rather, the first conductive layer arranged in the same layer as and electrically connected with the compensation electrode and the second bias voltage line arranged in the same layer as and electrically connected with the first bias voltage line are arranged in the peripheral area, then the first conductive layer is electrically connected with the second bias voltage line in the peripheral area, to allow the compensation electrode to be electrically connected with the first bias voltage line in the peripheral area, thereby saving punching space in the pixel units, and further avoiding loss of a filling rate of the photoelectric conversation device of high-resolution-ratio products.

It needs to be illustrated that for the above-mentioned plurality of first conductive layers 6 arranged in the same layer as the compensation electrode 52, "the same layer" herein refers to that the two film layers of the compensation electrode 52 and the first conductive layers 6 respectively are in the same layer and prepared under the same process, with the body parts being structurally disposed on the same plane.

It needs to be illustrated that for the above-mentioned second bias voltage line 7 arranged in the same layer as the first bias voltage line 4, "the same layer" herein refers to that two film layers of the first bias voltage line 4 and the second bias voltage line 7 are in the same layer and prepared under the same process, with the body parts being structurally disposed on the same plane on the same plane.

During specific implementation, in the above detection substrate provided by the embodiment of the disclosure, as shown in FIG. 2 to FIG. 8, the thin film transistor 2 includes a gate electrode 22, a gate insulating layer 23, an active layer 24, a source electrode 21 and a drain electrode 25 arranged in stack, and the photoelectric conversion device 3 further includes a photoelectric conversion layer 33 between the bottom electrode 31 and the top electrode. Specifically, the photoelectric conversion layer 33 is configured to convert an optical signal into an electric signal, and the bottom electrode 31 is configured to conduct the electric signal formed by the photoelectric conversion layer 33 after irradiation. There is a facing area between the bottom electrode 31 and the top electrode 32, and a storage capacitor is formed between the two. In addition, the compensation capacitor 5 is added in the disclosure, to increase the capacitance of the photoelectric conversion device 3, so that the electric signal converted by the photoelectric conversion layer 33 may be stored in the above storage capacitor and compensation capacitor 5, and the dynamic range of the output signal of the detection substrate can be increased. When the detection substrate works, for example, voltages ranging from −5V to −10 V are applied to the top electrodes 32 through the first bias voltage line 4, so that the photoelectric conversion layers 33 work under a negative bias voltage. The photoelectric conversion layers 33 generate different electric signals, and the electric signals are stored in the bottom electrode 31. The electric signals stored in the bottom electrodes 31 are transmitted to an external IC through the thin film transistors 2, so as to store image data.

Optionally, the photoelectric conversion layer 33 may be of a PN structure or a PIN structure. Specifically, the PIN structure includes an N-type-doped N-type semiconductor layer, an undoped intrinsic semiconductor layer I and a P-type-doped P-type semiconductor layer. A thickness of the intrinsic semiconductor layer I may be larger than thicknesses of the P-type semiconductor layer and the N-type semiconductor layer.

In addition, an orthographic projection of the top electrode 32 on the base substrate 1 is located in an orthographic projection of the photoelectric conversion layer 33 on the base substrate 1, that is, an area of the top electrode 32 is slightly smaller than an area of the photoelectric conversion layer 33. In this way, a leak current caused by damage via etching of side walls of the photoelectric conversion layer 33 may be reduced.

Optionally, the bottom electrode 31 may be made of molybdenum, aluminum, silver, copper, titanium, platinum, tungsten, tantalum, tantalum nitride, an alloy thereof and a combination thereof or other appropriate materials. The top electrode 32 may be made of an indium tin oxide (ITO) or an indium zinc oxide (IZO) or other appropriate transparent materials, so as to improve the light transmission efficiency.

During specific implementation, the above detection substrate provided by the embodiment of the disclosure, as shown in FIG. 2 to FIG. 4, further includes:

- an interlayer insulating layer 8 between the thin film transistor 2 and the photoelectric conversion device 3;
- a planarization layer 10 between the photoelectric conversion device 3 and the first bias voltage line 4; and
- a first passivation layer 11 between the planarization layer 10 and the first bias voltage line 4; where the bottom electrode 31 is electrically connected with the source electrode 21 through a fifth via V5 passing through the interlayer insulating layer 8.

During specific implementation, the above detection substrate provided by the embodiment of the disclosure, as shown in FIG. 2 to FIG. 4, further includes a second passivation layer 9 between the photoelectric conversion device 3 and the planarization layer 10, where the first bias voltage line 4 is electrically connected with the top electrode 32 of the photoelectric conversion device through a sixth via V6 passing sequentially through the first passivation layer 11, the planarization layer 10 and the second passivation layer 9.

In a possible implementation, in the above detection substrate provided by the embodiment of the disclosure, as shown in FIG. 2 and FIG. 4, the compensation electrode 52 may be arranged in the same layer as the source electrode 21, and the dielectric layer 51 of the compensation capacitor 5 is the interlayer insulating layer 8. In this way, only an original pattern needs to be changed when the source electrode 21 is formed, that is, patterns of the compensation electrode 52 and the source electrode 21 may be formed through one patterning process. A process of separately preparing the compensation electrode 52 is not required to be added, preparation process may be simplified, production costs can be saved, and the production efficiency can be improved.

In a possible implementation, in the above detection substrate provided by the embodiment of the disclosure, as shown in FIG. 3, the compensation electrode 52 may be arranged in the same layer as the gate electrode 22, and the dielectric layer 51 of the compensation capacitor 5 is the interlayer insulating layer 8 and the gate insulating layer 23. In this way, only an original pattern needs to be changed when the gate electrode 22 is formed, that is, patterns of the compensation electrode 52 and the gate electrode 22 may be formed through one patterning process. A process of separately preparing the compensation electrode 52 is not required to be added, preparation process may be simplified, production costs can be saved, and the production efficiency can be improved. In addition, compared with the compensation capacitor 5 shown in FIG. 2 and FIG. 4, a thickness of the dielectric layer 51 of the compensation capacitor 5 shown in FIG. 3 is larger, in this way, for the compensation electrode 52 with the same area, a capacitance value of the compensation capacitor 5 shown in FIG. 3 is increased about 50% compared with a capacitance value of the compensation capacitor shown in FIG. 2 and FIG. 4, and a specific increase of the capacitance value depends on a thickness of the gate insulating layer 23. In addition, the capacitance value may further be adjusted by adjusting the thicknesses of the interlayer insulating layer 8 and the gate insulating layer 23.

Taking the structure shown in FIG. 2 as an example, detailed description in the case that the compensation electrode 52 is electrically connected with the first bias voltage line 4 in the peripheral area BB is as follows.

Figure 5:
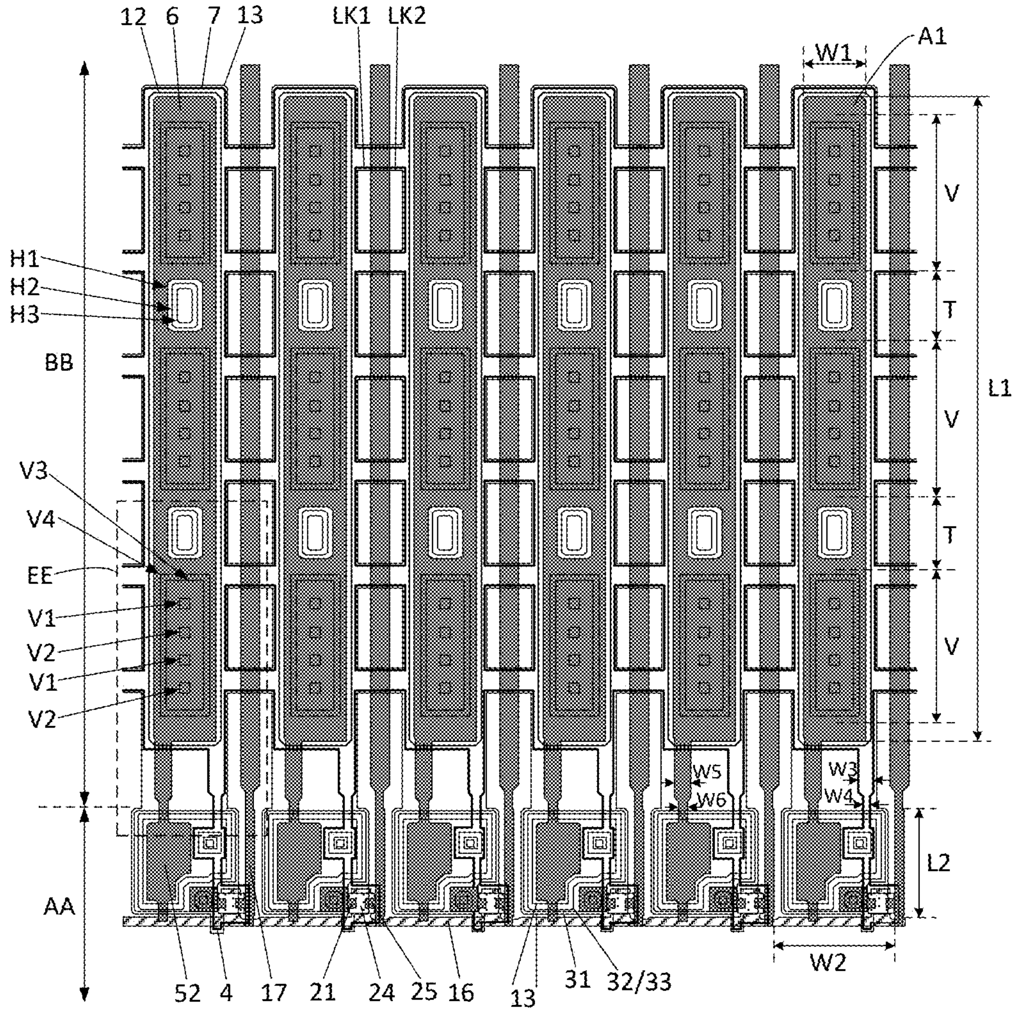
FIG. 5 shows a detailed schematic planar diagram of a detection substrate provided by the disclosure.
Figure 6:
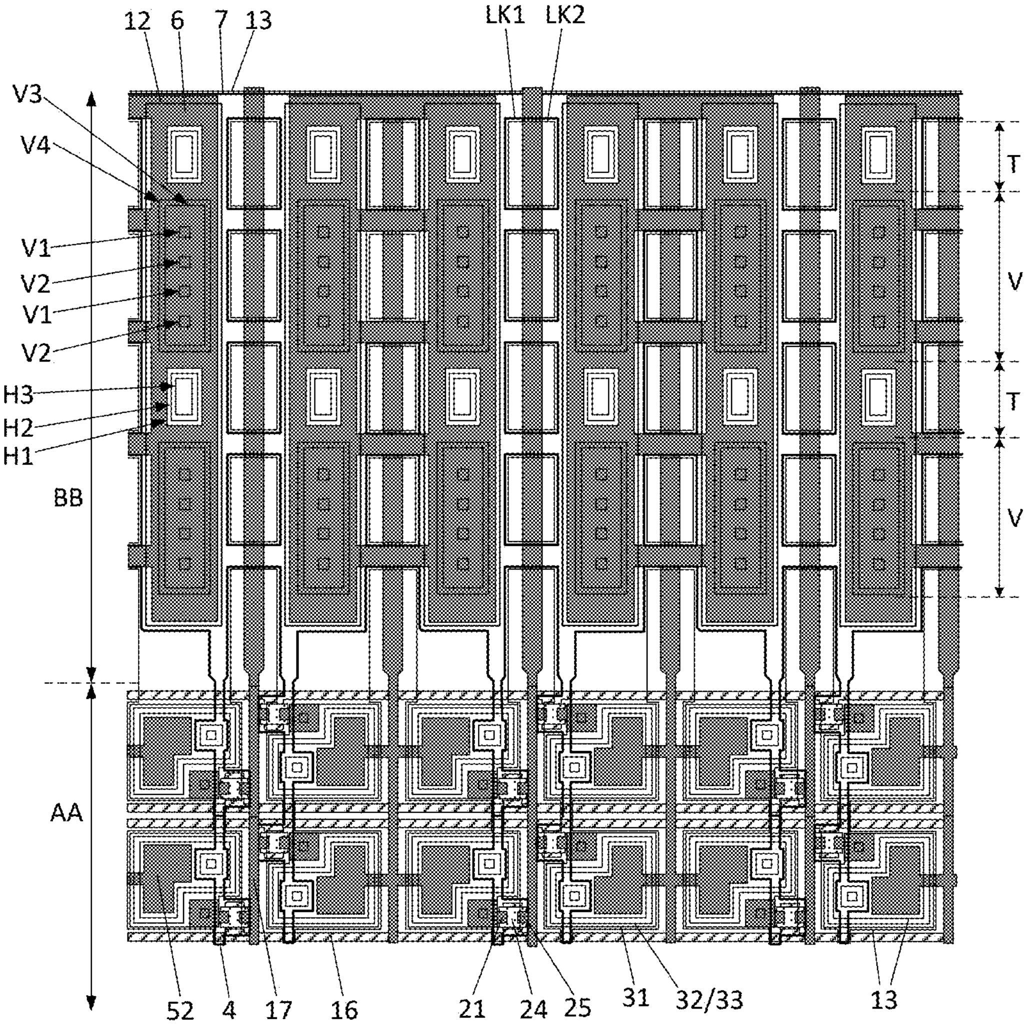
FIG. 6 shows yet another detailed schematic planar diagram of a detection substrate provided by the disclosure.

During specific implementation, the second bias voltage line 7 and the first conductive layer 6 in the peripheral area BB are connected generally through a via, since a plurality of other conductive film layers and insulating film layers are included between the second bias voltage line 7 and the first conductive layer 6, in order to avoid a poor electric connection between the second bias voltage line 7 and the first conductive layer 6 caused by a too large depth of the same via, in the detection substrate provided by the embodiment of the disclosure, as shown in FIG. 5 and FIG. 6, in the peripheral area BB, the detection substrate further includes a plurality of second conductive layers 12 between the first conductive layer 6 and the second bias voltage line 7, and the plurality of second conductive layers 12 are arranged at intervals. The second conductive layer 12 may be arranged in the same layer as the bottom electrode 31 in FIG. 2. The first conductive layer 6 is electrically connected with the second bias voltage line 7 through the second conductive layer 12. In this way, the second conductive layer 12 may serve as a lapping film layer between the first conductive layer 6 and the second bias voltage line 7, so that a problem of the poor electric connection between the second bias voltage line 7 and the first conductive layer 6 may be avoided.

It needs to be illustrated that the above-mentioned second conductive layer 12 may be arranged in the same layer as the bottom electrode 31 in FIG. 2, "the same layer" here refers to that two film layers of the bottom electrode 31 and the second conductive layer 12 are the same layer and prepared under the same process, with the body parts being structurally disposed on the same plane.

During specific implementation, in the above detection substrate provided by the embodiment of the disclosure, as shown in FIG. 5, one column of compensation electrodes 52 are correspondingly provided with at least one first conductive layer 6 and at least one second conductive layer 12. FIG. 5 takes an example that one column of compensation electrodes 52 are correspondingly provided with one first conductive layer 6 and one second conductive layer 12. A first overlapping area A1 between the first conductive layer 6, the second conductive layer 12 and the second bias voltage line 7 includes at least one via area V, the first conductive layer 6 is electrically connected with the second conductive layer 12 through the at least one via area V, and the second conductive layer 12 is electrically connected with the second bias voltage line 7 through the at least one via area V. In this way, the first conductive layer 6 may be electrically connected with the second conductive layer 12 through a plurality of via areas V, the second conductive layer 12 may be electrically connected with the second bias voltage line 7 through the plurality of via areas V, a contact area between the first conductive layer 6 and the second conductive layer 12 may be increased, and a contact area between the second conductive layer 12 and the second bias voltage line 7 may be increased, so that resistance of the first conductive layer 6, the second conductive layer 12 and the second bias voltage line 7 may be reduced, and the electricity property of the flat panel detector can be improved.

Figure 9:
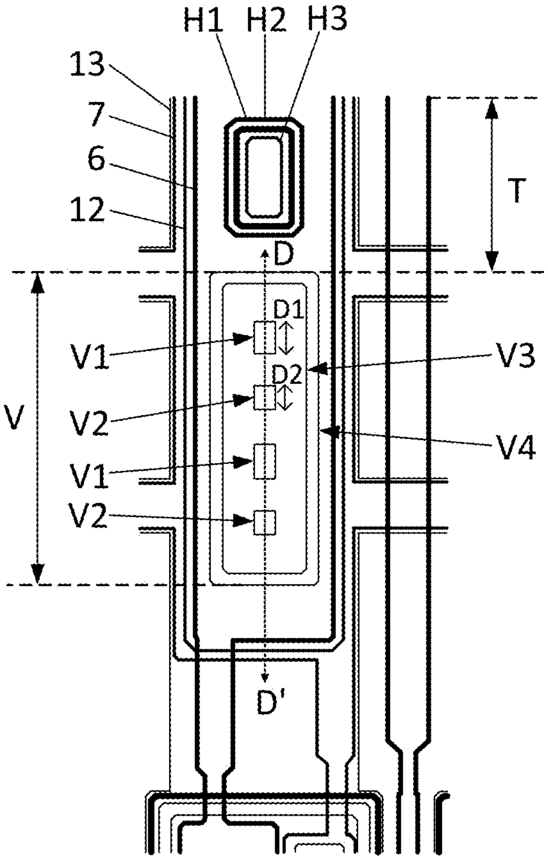
FIG. 9 shows an enlarged view of a dashed box EE in FIG. 5.
Figure 10A:
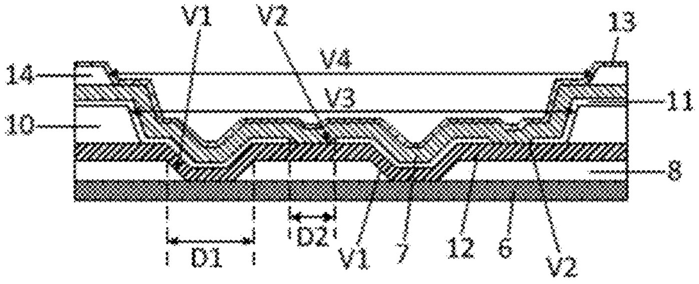
FIG. 10A shows a sectional view along a direction DD' in FIG. 9.

During specific implementation, in the above detection substrate provided by the embodiment of the disclosure, as shown in FIG. 5, FIG. 9 and FIG. 10A, FIG. 9 shows an enlarged view of a dashed box EE in FIG. 5, and FIG. 10A shows a sectional view along a direction DD' in FIG. 9. Each via area V includes at least one first via V1 (two first vias are shown as an example, which may be one or more) passing through the interlayer insulating layer 8, at least one second via V2 (two second vias are shown as an example, which may be one or more) passing through the first passivation layer 11, and at least one third via V3 (one third via is shown as an example) passing through the planarization layer 10.

In the same via area V, an orthographic projection of the second via V2 on the base substrate 1 is located within a scope of an orthographic projection of the third via V3 on the base substrate 1. The first conductive layer 6 is electrically connected with the second conductive layer 12 through the first via V1, and the second conductive layer 12 is electrically connected with the second bias voltage line 7 through the second via V2 and the third via V3. Specifically, the first conductive layer 6 is electrically connected with the second conductive layer 12 through the plurality of first vias V1, so that the contact area between the first conductive layer 6 and the second conductive layer 12 may be further increased, and contact resistance of the first conductive layer 6 and the second conductive layer 12 may be further reduced. Besides, since a material of the planarization layer 10 generally is a resin material for planarization and its thickness is relatively larger (generally larger than 2 μm), if the second via V2 and the third via V3 are the same in size and their orthographic projections overlap, the second via V2 and the third via V3 of the same in size form a deep via, which will easily cause breakage of the second bias voltage line 7 at the deep via. For facilitating a good lapping between the second bias voltage line 7 and the second conductive layer 12, the third via V3 is designed as a large via, the second bias voltage line 7 may be filled throughout the third via V3, and electrically connected with the second conductive layer 12 through the second via V2 passing through the first passivation layer 11, so as to prevent the problem of breakage of the second bias voltage line 7 caused by an excessive segment gap of the via. In addition, there may be a plurality of second vias V2, so that the contact resistance between the second conductive layer 12 and the second bias voltage line 7 may be further reduced.

Figure 10B:
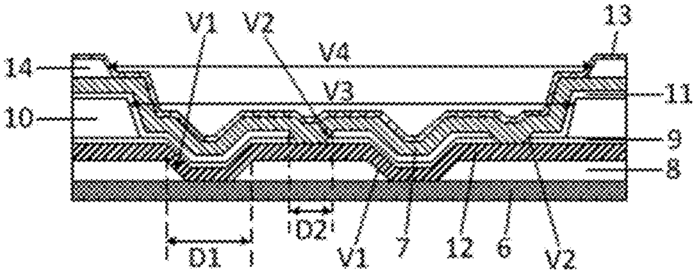
FIG. 10B shows yet another sectional view along a direction DD' in FIG. 9.

During specific implementation, as shown in FIG. 10A, since materials of the first conductive layer 6, the second conductive layer 12 and the second bias voltage line 7 are metal, and the adhesion between the resin and the metal is low, this will cause the planarization layer 10 and the film layer manufactured thereon to be fallen off the second conductive layer 12. Therefore, in the detection substrate provided by the embodiment of the disclosure, as shown in FIG. 10B, another sectional view along the direction DD' in FIG. 9 is provided. The second passivation layer 9 is reserved between the planarization layer 10 and the second conductive layer 12, and the second passivation layer 9 is in direct contact with the first passivation layer 11 at the third via V3. In this way, the second via V2 passes through the second passivation layer 9 and the first passivation layer 11, and the problem of film layer falling may be avoided.

During specific implementation, in order to protect a surface of the detection substrate and block static electricity, the above detection substrate provided by the embodiment of the disclosure, as shown in FIG. 2, FIG. 5, FIG. 9, FIG. 10A and FIG. 10B, further includes a shielding layer 13 at a side of the first bias voltage line 4 facing away from the base substrate 1, and a third passivation layer 14 between the first bias voltage line 4 and the shielding layer 13. The shielding layer 13 covers the first overlapping area A1. Each via area V further includes at least one fourth via V4 passing through the third passivation layer 14, and the shielding layer 13 is electrically connected with the second bias voltage line 7 through the fourth via V4. Specifically, in order to prevent the shielding layer 13 from affecting the light transmittance, a material of the shielding layer 13 generally is a transparent conductive material, for example, indium tin oxide (ITO), boron-doped zinc oxide (BZO) and aluminum-doped zinc oxide (AZO).

During specific implementation, in the above detection substrate provided by the embodiment of the disclosure, as shown in FIG. 5, FIG. 9, FIG. 10A and FIG. 10B, in the same via area V, an orthographic projection of the first via V1 on the base substrate 1 may be located within the scope of the orthographic projection of the third via V3 on the base substrate 1, the first via V1 and the second via V2 may be alternately arranged in an extension direction of the first overlapping area A1, and the orthographic projection of the third via V3 on the base substrate 1 is located within a scope of an orthographic projection of the fourth via V4 on the base substrate 1. Specifically, since the resistivity of the transparent conductive material of the shielding layer 13 is relatively large, in order to reduce the contact resistance of the shielding layer 13 and the first bias voltage line 4, the fourth via V4 is designed into a large via. In addition, the first via V1 and the second via V2 are designed in such a way that their orthographic projections are located within the scope of the orthographic projection of the third via V3, in this way, in a case of the fourth via V4 with a certain size, a size of the via area V may not be expanded, and the first overlapping area A1 may have more space to set more via areas V, which further reduces the contact resistance between the conductive layers.

During specific implementation, in order to allow the fourth via to completely wraps the third via, and the third via to completely wraps the second via, in the detection substrate provided by the embodiment of the disclosure, as shown in FIG. 10A and FIG. 10B, a distance between edges of the orthographic projections of the third via V3 and the fourth via V4 on the base substrate 1 is larger than 2.5 μm, and a distance between edges of the orthographic projections of the third via V3 and the second via V2 on the base substrate 1 is larger than 2.5 μm.

Optionally, a size of the first via V1 is 10 μm*10 μm, a size of the second via V2 is 8 μm*8 μm, a size of the third via V3 is 20 μm*75 μm, and a size of the fourth via V4 is 25 μm*80 μm.

During specific implementation, as shown in FIG. 2, FIG. 5, FIG. 9, FIG. 10A and FIG. 10B, in order to simplify the manufacture process, the second via V2 and the sixth via V6 may be manufactured through one patterning process. In order to ensure a filling rate of the pixel units, the etching size of the sixth via V6 is relatively small, and the size of the second via V2 is also small. Since a thickness of the interlayer insulating layer 8 generally is much larger than thicknesses of the passivation layers (9 and 11), in order to ensure a good electrical contact between the second conductive layer 12 and the first conductive layer 6, the size of the first via V1 needs to be designed larger than the size of the second via V2. Thus, in the above detection substrate provided by the embodiment of the disclosure, an aperture D1 of the first via V1 is larger than an aperture D2 of the second via V2, for example, the aperture refers to a length of the first via V1 and the second via V2 in a distribution direction.

Optionally, materials of the second passivation layer 9, the first passivation layer 11, the third passivation layer 14, the gate insulating layer 23 and the interlayer insulating layer 8 may be inorganic materials, such as silicon nitride, silicon oxide and silicon oxynitride.

During specific implementation, the above detection substrate provided by the embodiment of the disclosure, as shown in FIG. 2, further includes a scintillator layer 15 at a side of the shielding layer 13 facing away from the base substrate 1. A material of the scintillator layer 15 is a material capable of converting X rays into visible light. The scintillator layer 15 is mainly composed of a scintillator, and the scintillator itself is a material capable of emitting light after absorbing high-energy particles or rays, which is usually processed into crystals in applications to be called a scintillation crystal. The embodiment of the disclosure does not limit specific materials of the scintillation crystal of the scintillator layer 15, which may be cesium iodide (CsI), cadmium tungstate, barium fluoride, sulfur gadolinium oxide (GOS), etc.

Specifically, a working process of the detection substrate shown in FIG. 2 provided by the embodiment of the disclosure is that: under the impact of high-energy particles of the X ray, the scintillator layer 15 converts kinetic energy of the high-energy particles into light energy to flash (a visible optical signal), the photoelectric conversation device 3 can convert the optical signal into an electrical signal, and the electrical signal can be read through the thin film transistor 2, so as to obtain an X-ray image through subsequent processing (including amplifying, converting, etc.) of the signal.

During specific implementation, as shown in FIG. 2, after the scintillator layer 15 is manufactured, the scintillator layer needs to be packaged. A packaging layer and the base substrate 1 generally are fixed through UV glue, and the UV glue needs to be irradiated and cured by ultraviolet light. Since the packaging layer is opaque, the UV glue needs to be incident from one side of the base substrate. Therefore, in the above detection substrate provided by the embodiment of the disclosure, as shown in FIG. 5 and FIG. 9, the first overlapping area A1 further includes a transmitting area T spaced from the via area V. The transmitting area T includes a first through hole H1 passing through the first conductive layer 6, a second through hole H2 passing through the second conductive layer 12 and a third through hole H3 passing through the second bias voltage line 7, and the first through hole H1, the second through hole H2 and the third through hole H3 are sleeve holes. In this way, the transmitting area T may be irradiated from one side of the base substrate 1, so as to cure the UV glue, which achieves packaging of the scintillator layer 15.

During specific implementation, in order to ensure stable light transmittance of the transmitting area, in the above detection substrate provided by the embodiment of the disclosure, as shown in FIG. 5 and FIG. 9, areas of orthographic projections of the first through hole H1, the second through hole H2 and the third through hole H3 on the base substrate 1 decrease successively.

During specific implementation, in order to ensure alignment precision of the UV glue and the transmitting area, as shown in FIG. 5 and FIG. 9, a distance between edges of orthographic projections of the first through hole H1 and the second through hole H2 on the base substrate 1 is larger than 2.5 μm, and a distance between edges of orthographic projections of the second through hole H2 and the third through hole H3 on the base substrate 1 is larger than 2.5 μm.

During specific implementation, in the above detection substrate provided by the embodiment of the disclosure, as shown in FIG. 5, the via areas V and the transmitting areas T may be alternately arranged, which is not limited as such. In this way, a plurality of via areas V and a plurality of transmitting areas T may be arranged, so as to achieve the effects of reducing the contact resistance to the greatest extent and ensuring a packaging effect of the package layer on the scintillator layer.

Specifically, in FIG. 5, the same column with three via areas V and two transmitting areas T is taken as an example, and of course, the quantities of the via areas V and the transparent areas T in the same column may be adjusted according to actual wiring space and resistance requirements of the first bias voltage line 4.

During specific implementation, in the above detection substrate provided by the embodiment of the disclosure, as shown in FIG. 5, the detection area AA further includes first signal lines 16 (such as gate lines) and second signal lines 17 (such as data lines) insulated and intersecting with each other. Each second signal line 17 is electrically connected with drain electrodes 25 of the thin film transistors 2 in a column of pixel units P, and each first signal line 16 is electrically connected with gate electrodes 22 of the thin film transistors 2 in a column of pixel units P. An orthographic projection of the first bias voltage line 4 on the base substrate 1 may mutually overlap with an orthographic projection of the pixel unit P on the base substrate 1.

Here, the plurality of compensation electrodes 52 arranged in an arrangement direction of the via area V (for example, a column direction of the pixel units) are connected in series successively, and the first conductive layer 6 is electrically connected with a compensation electrode 52 closest to the first conductive layer 6 in the compensation electrodes 52 connected in series.

Figure 11:
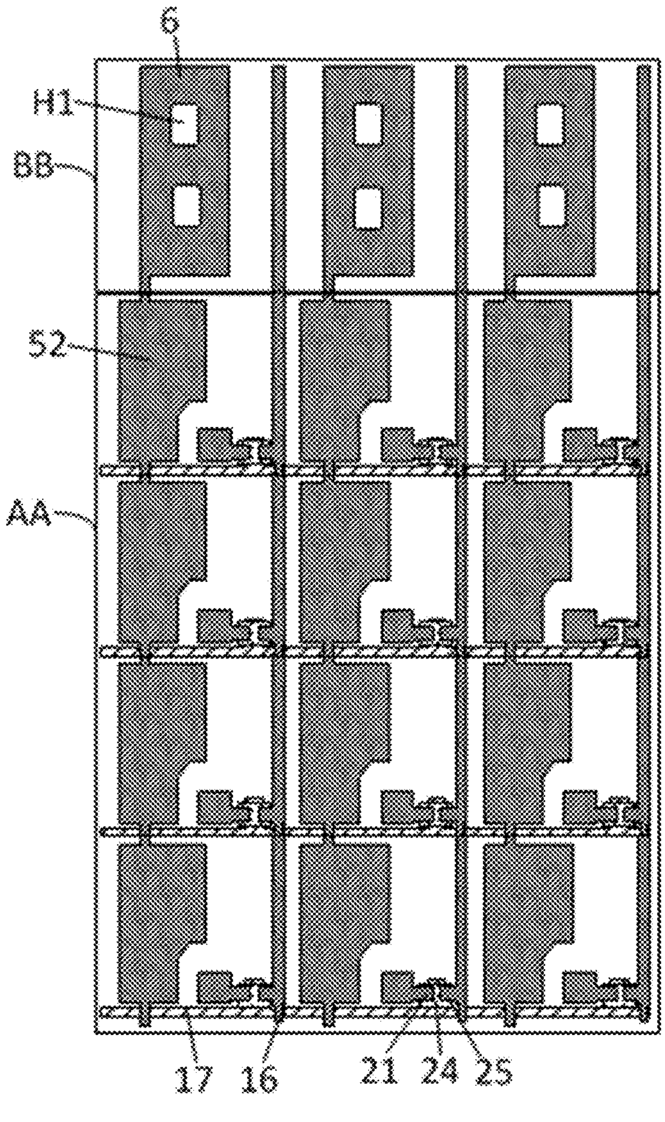
FIG. 11 shows a schematic planar diagram of a first conductive layer and a compensation electrode in a structure shown in FIG. 5.

In order to clearly illustrate a connection relationship between the first conductive layer 6 and the compensation electrode 52, as shown in FIG. 11, FIG. 11 shows a schematic planar diagram of the first conductive layer 6 and the compensation electrode 52 in a structure shown in FIG. 5, and FIG. 11 illustrates more pixel units in the detection area AA compared with FIG. 5, so as to illustrate that a column of compensation electrodes 52 are connected in series successively.

During specific implementation, in the above detection substrate provided by the embodiment of the disclosure, as shown in FIG. 5, the embodiment of the disclosure takes an example that an electrical connection between the second bias voltage line 7 and the first conductive layer 6 is realized at a side of an extension direction of the second signal line 17 (data line), the second signal lines 17 generally extend to the peripheral area BB to be electrically connected with a drive chip (IC) in the peripheral area BB. In order to reduce overlap capacitance between the data line and the second bias voltage line 7 and reduce overlap capacitance between the data line and the shielding layer 13, an overlapping area between orthographic projections of the second bias voltage line 7 and the second signal line 17 on the base substrate 1 has a plurality of first hollow-out structures LK1 arranged at intervals, and an overlapping area between orthographic projections of the shielding layer 13 and the second signal line 17 on the base substrate 1 has a plurality of second hollow-out structures LK2 arranged at intervals. In this way, the overlap capacitance between the data line and the second bias voltage line 7 and the overlap capacitance between the data line and the shielding layer 13 may be reduced, so as to avoid mutual interference.

During specific implementation, in the above detection substrate provided by the embodiment of the disclosure, as shown in FIG. 5, an orthographic projection of the first hollow-out structure LK1 on the base substrate 1 partially overlaps with an orthographic projection of the second hollow-out structure LK2 on the base substrate 1. Certainly, they may overlap or may not overlap.

Figure 12A:
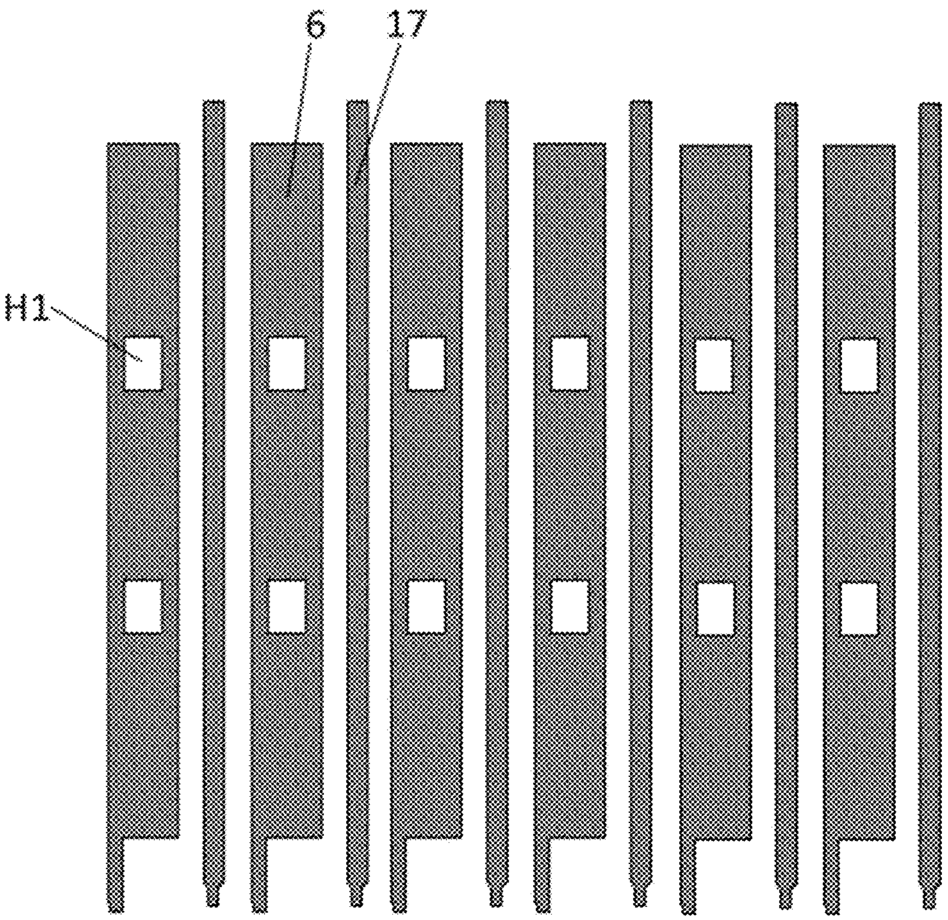
FIG. 12A shows a schematic planar diagram of a first conductive layer in a peripheral area.
Figure 12B:
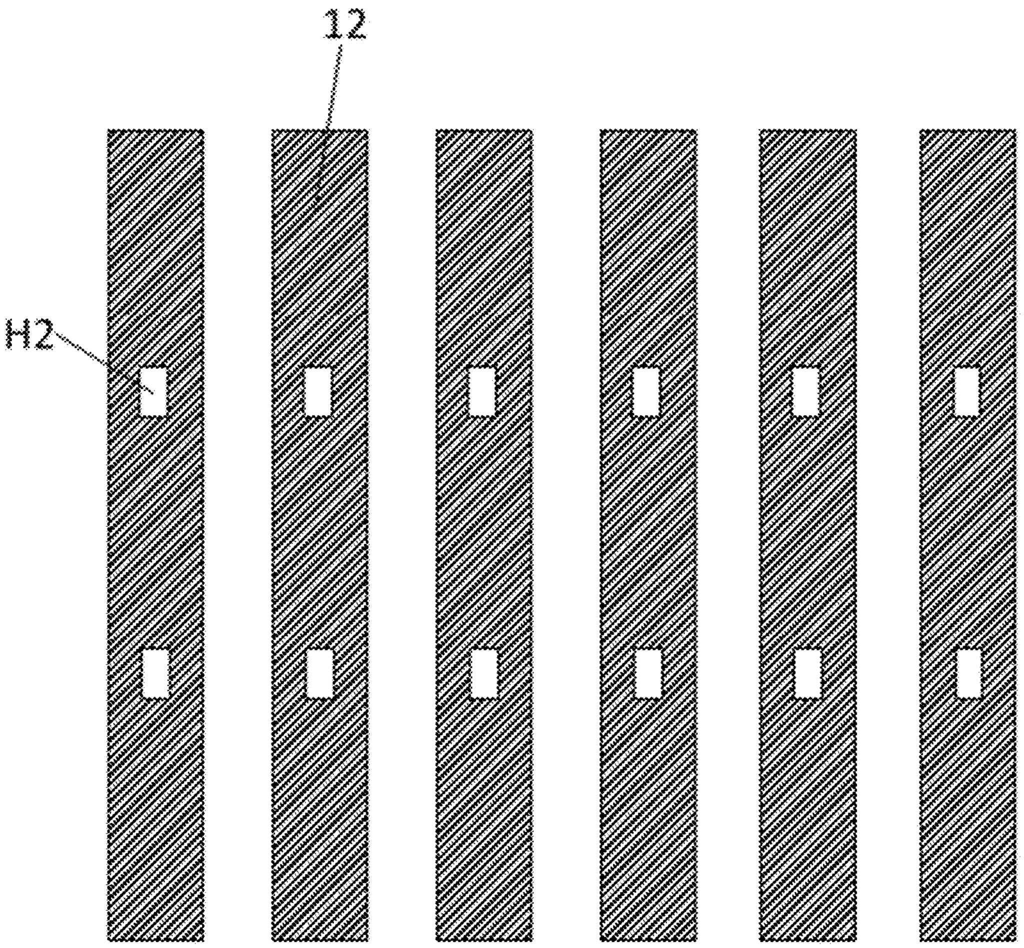
FIG. 12B shows a schematic planar diagram of a second conductive layer in a peripheral area.
Figure 12C:
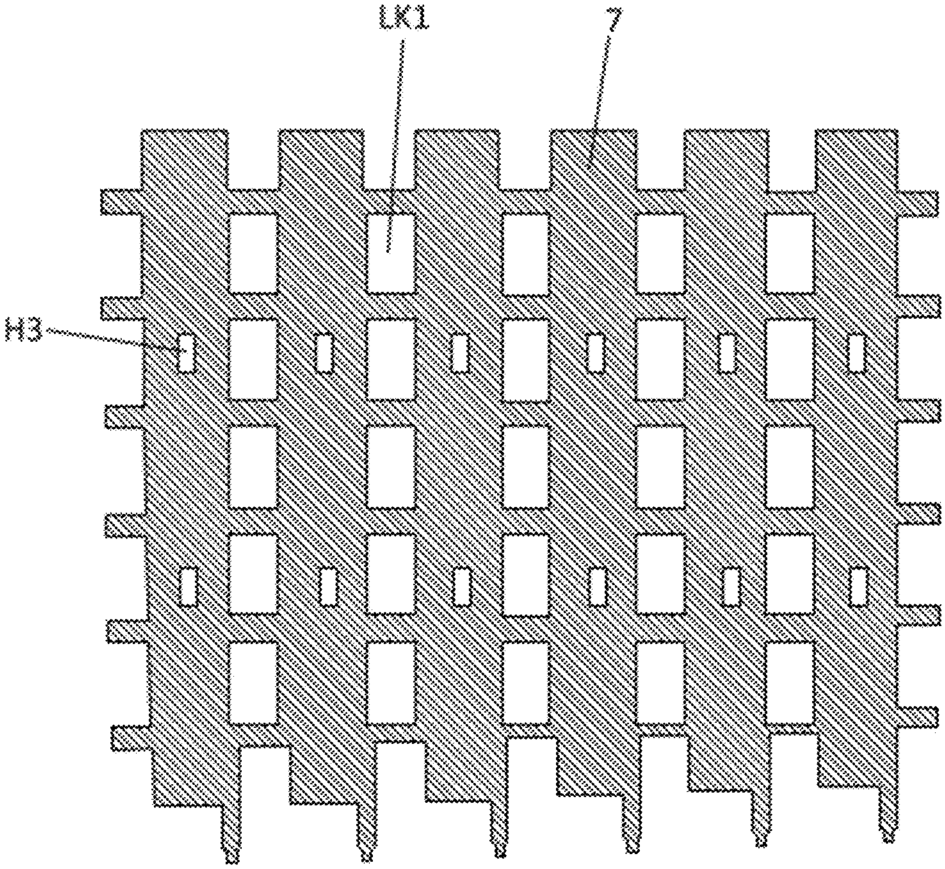
FIG. 12C shows a schematic planar diagram of a second bias voltage line in a peripheral area.
Figure 12D:
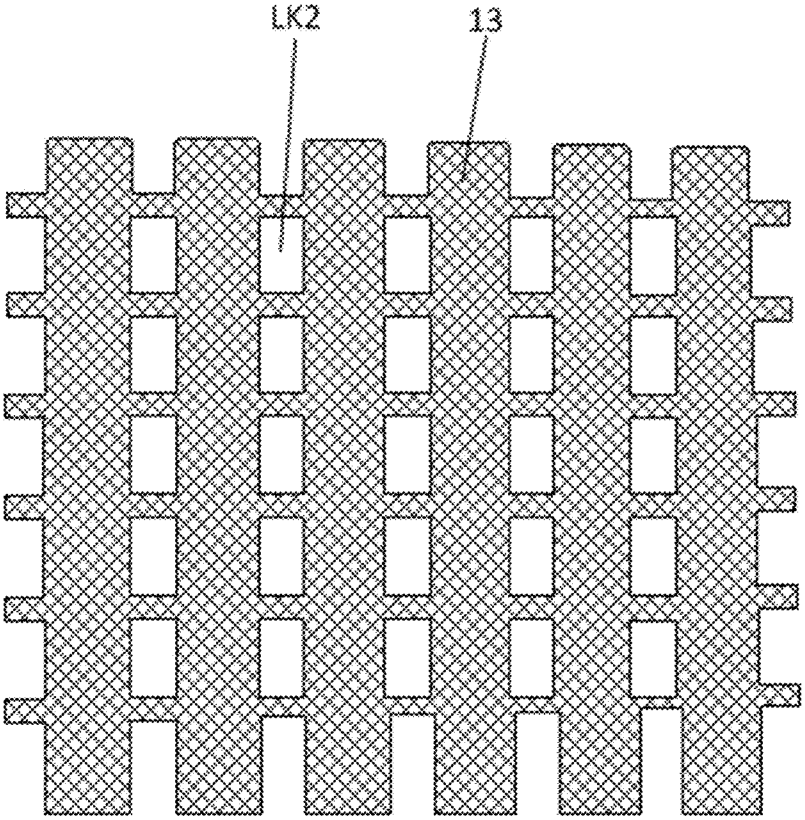
FIG. 12D shows a schematic planar diagram of a shielding layer in a peripheral area.

In order to clearly illustrate structures of the first conductive layer 6, the second conductive layer 12, the second bias voltage line 7 and the shielding layer 13 located in the peripheral area BB in FIG. 5, as shown in FIG. 12A to FIG. 12D, FIG. 12A shows a schematic planar diagram of the first conductive layer 6 in the peripheral area BB, FIG. 12B shows a schematic planar diagram of the second conductive layer 12 in the peripheral area BB, FIG. 12C shows a schematic planar diagram of the second bias voltage line 7 in the peripheral area BB, and FIG. 12D is a schematic planar diagram of the shielding layer 13 in the peripheral area BB.

During specific implementation, in the above detection substrate provided by the embodiment of the disclosure, as shown in FIG. 5, a value of a width W1 of the first overlapping area A1 needs to be matched with and designed according to the size of the pixel unit P. Generally, the larger of the width W1, the better. Optionally, a ratio of the width W1 of the first overlapping area A1 to a width W2 of the pixel unit P may range from 50% to 75%, for example, the ratio is 50%, 55%, 60%, 65%, 70% and 75%. A value of a length L1 of the first overlapping area A1 needs to be designed according to the wiring space and resistance requirements of the first bias voltage line 4. Optionally, the length L1 of the first overlapping area A1 may be 2-6 times of a length L2 of the pixel unit P, for example, the length L1 of the first overlapping area A1 is 2 times, 2.5 times, 3 times, 3.5 times, 4 times, 4.5 times, 5 times, 5.5 times or 6 times of the length L2 of the pixel unit P.

During specific implementation, in the above detection substrate provided by the embodiment of the disclosure, as shown in FIG. 5, at a position where the first bias voltage line 4 is connected with the second bias voltage line 7, a width W3 of the second bias voltage line 7 is larger than a width W4 of the first bias voltage line 4. The second bias voltage line 7 is widened in the peripheral area BB, so that the resistance of the second bias voltage line 7 may be reduced. The first bias voltage line 4 is shortened in the detection area AA according to the design requirements of the pixel units, so as to ensure that an overall RC load of the pixel units, the pixel filling rate and like meet specification requirements.

During specific implementation, in the above detection substrate provided by the embodiment of the disclosure, as shown in FIG. 5, at a position where the first conductive layer 6 is connected with the compensation electrode 52, a width W5 of the first conductive layer 6 is larger than a width W6 of the compensation electrode 52. The first conductive layer 6 is widened in the peripheral area BB, so that the resistance of the first conductive layer 6 may be reduced. The compensation electrode 52 is decreased in the detection area AA according to the design requirements of the pixel units, so as to ensure that the overall RC load of the pixel units, the pixel filling rate and like meet the specification requirements.

Figure 13:
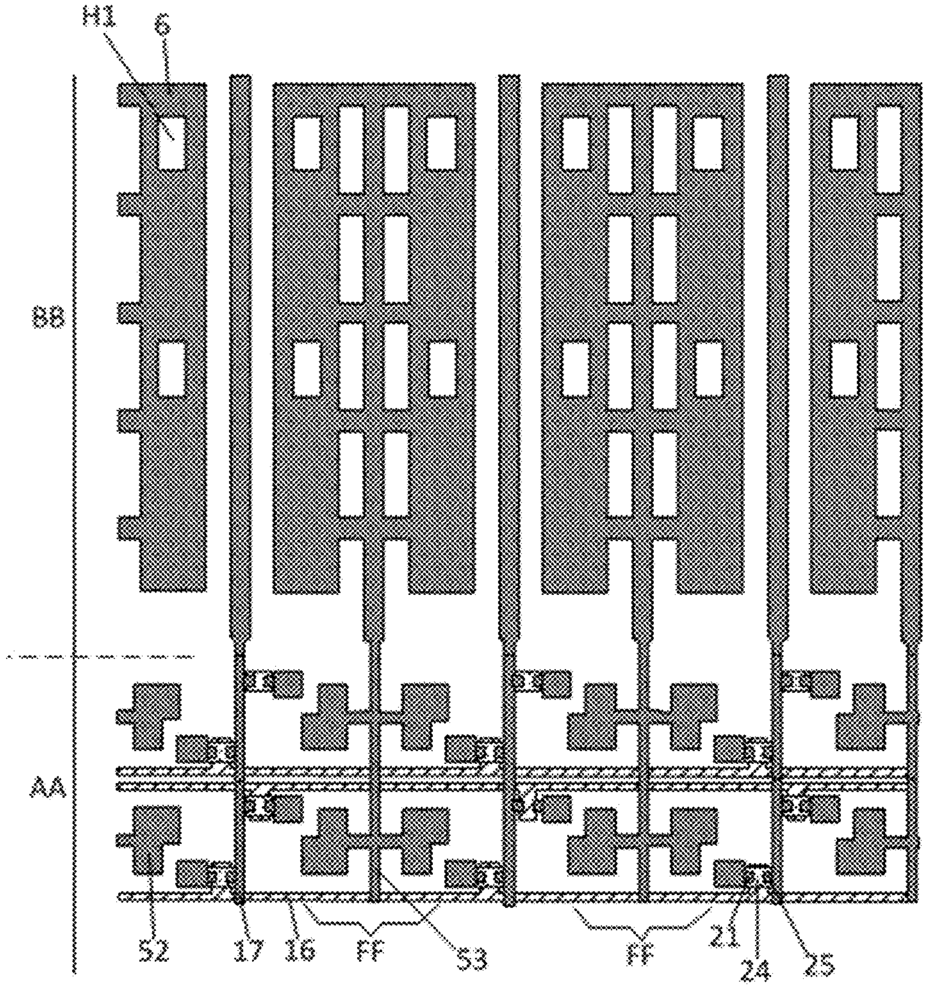
FIG. 13 shows a schematic planar diagram of a first conductive layer and a compensation electrode in a structure shown in FIG. 6.

During specific implementation, in the above detection substrate provided by the embodiment of the disclosure, as shown in FIG. 2, FIG. 6 and FIG. 13, FIG. 6 shows yet another schematic planar diagram of a structure shown in FIG. 2 in the peripheral area. FIG. 13 is a schematic planar diagram of the first conductive layer 6 and the compensation electrode 52 in a structure shown in FIG. 6. The detection area AA further includes first signal lines 16 (such as gate lines) and second signal lines 17 (such as data lines) insulated and intersecting with each other. Each second signal line 17 is electrically connected with drain electrodes 25 of the thin film transistors 2 in two adjacent columns of pixel units P. Gate electrodes 22 of the thin film transistors 2 in one row of pixel units P are electrically connected with either of the two first signal lines 16 at two sides of the one row of pixel units P alternately.

Here, two columns of compensation electrodes 52 between every two adjacent second signal lines 17 form one group FF. One compensation line 53 is arranged at a gap between two adjacent columns of pixel units P in each group FF. The compensation line 53 extends to the peripheral area BB, and the compensation line 53 is arranged in the same layer as the compensation electrodes 52 at the two sides and is electrically connected with the compensation electrodes 52 at the two sides. Each group of compensation electrodes 52 correspond to two first conductive layer 6. In this way, one data line is simultaneously connected with the two columns of pixel units P at the two sides, and one gate line is just connected with a half of the pixel units P in adjacent row of pixels, which not only can reduce the quantity of the data lines, but also reduce the quantity of the driving ICs, to thereby reducing the cost. Meanwhile, the wiring space may be provided for the compensation line 53. One compensation line 53 may be connected with the compensation electrodes 52 of the two columns of pixel units at the two sides, and the compensation line 53 can extend to the peripheral area BB to be electrically connected with the two first conductive layers at the two sides.

It needs to be illustrated that the structure shown in FIG. 6 that the electrical connection mode of the compensation electrodes 52 and the first bias voltage line 4 in the peripheral area BB is basically the same as the electrical connection mode shown in FIG. 5. Main differences between FIG. 6 and FIG. 5 are as follows: (1) in FIG. 6, there are two via areas V and two transmitting areas T in a same one column of the peripheral area BB, and compared with FIG. 5 in which three via areas V and two transmitting areas T are shown in a same one column of the peripheral area BB, the length L1 of the first overlapping area A1 in FIG. 6 is reduced, so as to meet requirements of narrow frame products; (2) connection relations of pixel units P with the gate lines and pixel units P with the data lines in FIG. 5 and FIG. 6 are different (described earlier); and (3) the electrical connection mode of the compensation electrodes 52 and the first conductive layer 6 in FIG. 5 is different from that in FIG. 6, and the schematic diagram of the cross section of the via area V and the transmitting area T is the same as that in FIG. 10A or FIG. 10B. Other designs may refer to the structure shown in FIG. 5.

It needs to be illustrated that in the detection substrate provided by the embodiment of the disclosure, the connection relationship of the pixel unit with the gate line and the data line is not limited to the connection relationship shown in FIG. 5 and FIG. 6, and may be other connection relationships, and as long as the mode of adding the compensation capacitor provided by the embodiment of the disclosure is adopted and the compensation capacitor is electrically connected with the first bias voltage line in the peripheral area, they all belong to the scope of protection of the disclosure.

The structure shown in FIG. 3 is taken as an example, and an electrical connection of the compensation electrodes 52 and the first bias voltage line 4 is described below in detail in the peripheral area BB.

Figure 7:
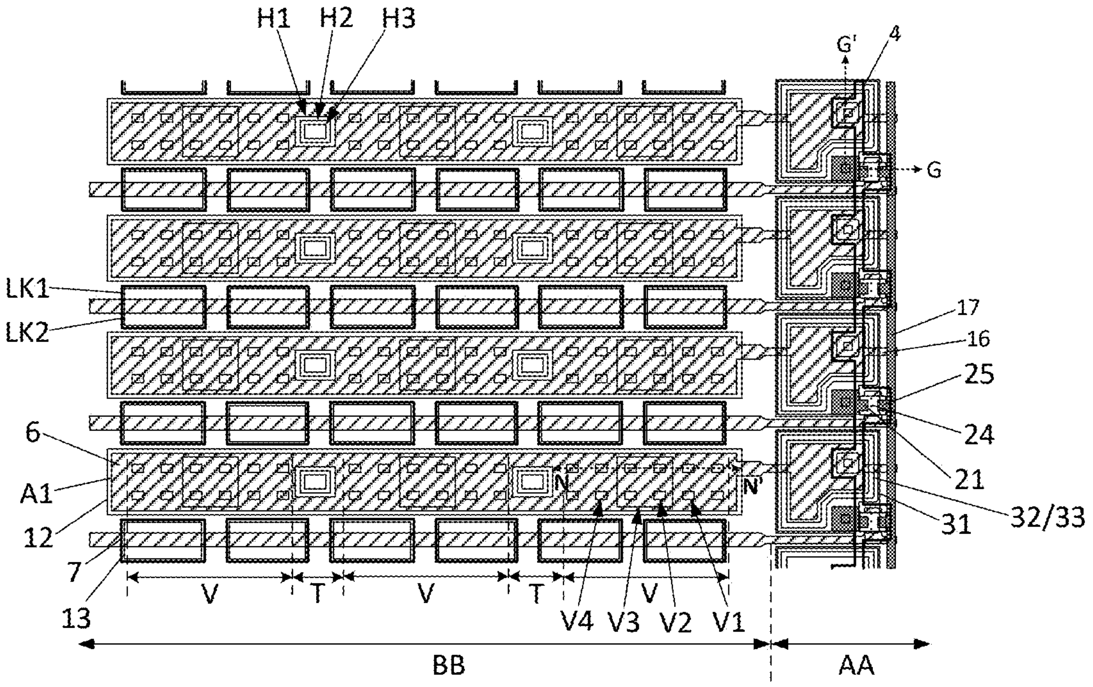
FIG. 7 shows yet another detailed schematic planar diagram of a detection substrate provided by the disclosure.
Figure 14:
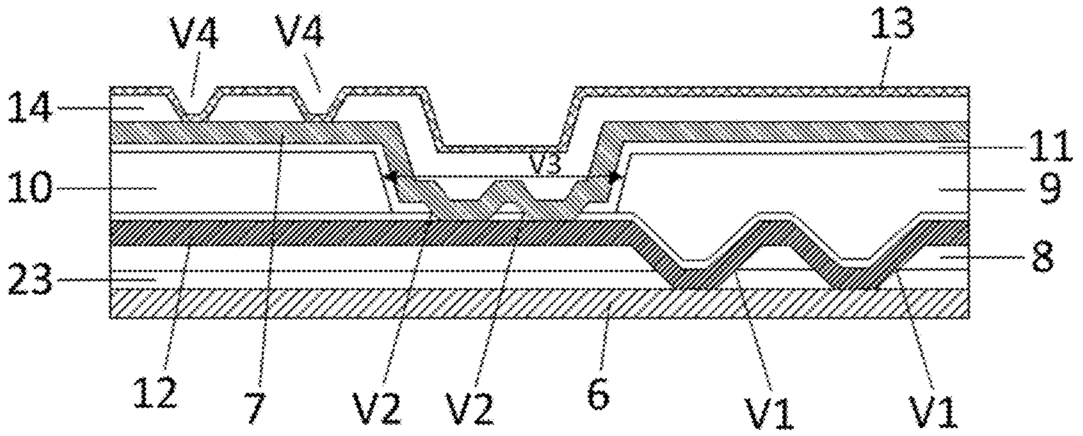
FIG. 14 shows a sectional view along a direction NN' in FIG. 7.

During specific implementation, in the above detection substrate provided by the embodiment of the disclosure, as shown in FIG. 3, FIG. 7 and FIG. 14, FIG. 7 shows a schematic planar diagram of a structure shown in FIG. 3 in the peripheral area BB, FIG. 3 shows a sectional view along a direction GG' in FIG. 7, and FIG. 14 shows a sectional view along a direction NN' in FIG. 7. The compensation electrode 52 is arranged in the same layer as the gate electrode 22, the dielectric layer 51 of the compensation capacitor 5 is the interlayer insulating layer 8 and the gate insulating layer 23, and thus, the first via V1 further passes through the gate insulating layer 23.

A film layer relationship between the first conductive layer 6, the second conductive layer 12, the second bias voltage line 7 and the shielding layer 13 and patterns of film layers are the same as that shown in FIG. 5, and a via connection arrangement mode between the first conductive layer 6, the second conductive layer 12, the second bias voltage line 7 and the shielding layer 13 is the same as that in FIG. 7.

During specific implementation, in the above detection substrate provided by the embodiment of the disclosure, as shown in FIG. 3, FIG. 7 and FIG. 14, a connection relationship of the pixel unit P in the detection area AA with the gate line and the date line is the same as the connection relationship shown in FIG. 5. Positions of the first conductive layer 6, the second conductive layer 12 and the second bias voltage line 7 in the peripheral area BB in FIG. 7 are different from that in FIG. 5. In FIG. 5, the first conductive layer 6, the second conductive layer 12 and the second bias voltage line 7 are arranged at a side of an extension direction of the second signal lines 17 (data lines) to allow the second bias voltage line 7 to be electrically connected with the first conductive layer 6. In FIG. 7, the first conductive layer 6, the second conductive layer 12 and the second bias voltage line 7 are arranged at a side of an extension direction of the first signal lines 16 (gate lines) to allow the second bias voltage line 7 to be electrically connected with the first conductive layer 6. In both FIG. 7 and FIG. 5, the second bias voltage line 7 is electrically connected with the first conductive layer 6 through three via areas V, and the transmitting area T is arranged between two adjacent via areas V. In FIG. 7, the plurality of first hollow-out structures LK1 arranged at intervals are arranged in the overlapping area between orthographic projections of the second bias voltage line 7 and the second signal lines 17 on the base substrate 1, and the plurality of second hollow-out structures LK2 arranged at intervals are arranged in the overlapping area between orthographic projections of the shielding layer 13 and the second signal lines 17 on the base substrate 1. A main difference between FIG. 7 and FIG. 5 is that arrangement modes of the first via V1, the second via V2, the third via V3 and the fourth via V4 in a same one via area V are different.

Specifically, as shown in FIG. 7 and FIG. 14, in the same one via area V, the orthographic projection of the first via V1 on the base substrate 1 does not overlap with the orthographic projection of the third via V3 on the base substrate 1, and the orthographic projection of the fourth via V4 on the base substrate 1 does not overlap with the orthographic projection of the third via V3 on the base substrate 1. It can be seen that the third via V3 still adopts the large via design, which facilitates metal lap joint, and prevents breakage of the second bias voltage line 7 caused by an excessive step difference. The first via V1, the second via V2 and the fourth via V4 all adopt small via design, in this way, more quantity of first vias V1 and fourth vias V4 may be arranged outside of the third via V3, and more quantity of second vias V2 may further be arranged, so as to further reduce the contact resistance between metal layers.

During specific implementation, in the above detection substrate provided by the embodiment of the disclosure, as shown in FIG. 7 and FIG. 14, the first vias V1, the second vias V2 and the fourth vias V4 may be distributed in an array, for example, the disclosure takes an example that the first vias V1, the second vias V2 and the fourth vias V4 are distributed in a 2*2 array, which is not limited here.

During specific implementation, in the above detection substrate provided by the embodiment of the disclosure, as shown in FIG. 7 and FIG. 14, the fourth vias V4 may be moved above the first vias V1, or the first vias V1 may be moved below the fourth vias V4, or positions of the first vias V1 and the fourth vias V4 are interchanged.

During specific implementation, in the above detection substrate provided by the embodiment of the disclosure, as shown in FIG. 7, vias in the via area V in FIG. 5 are arranged in a line, vias in the via area V in FIG. 7 are arranged in an array, and the overall flatness of each area of the detection substrate may be ensured to be consistent, which is conductive to subsequent evaporation of the scintillator layer 15.

Figure 8:
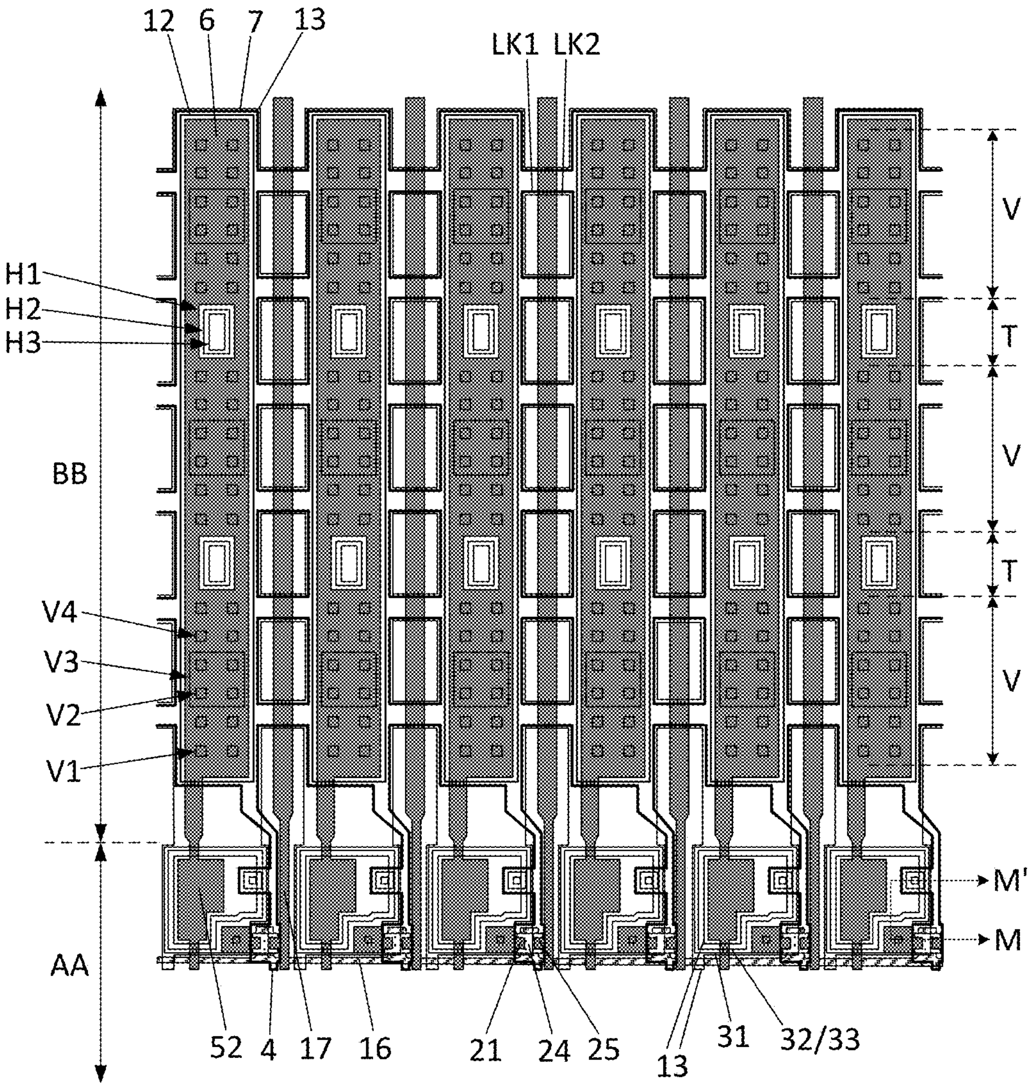
FIG. 8 shows yet another detailed schematic planar diagram of a detection substrate provided by the disclosure.

During specific implementation, in the above detection substrate provided by the embodiment of the disclosure, as shown in FIG. 5, FIG. 6 and FIG. 7, all of which show that the orthographic projection of the first bias voltage line 4 on the base substrate 1 mutually overlaps the orthographic projection of the pixel unit P on the base substrate 1, in this way, the first bias voltage line 4 occupies a certain pixel space, and the pixel filling rate is reduced. In order to further improve the pixel filling rate, as shown in FIG. 4 and FIG. 8, FIG. 4 shows a sectional view along a direction MM' in FIG. 8, and the orthographic projection of the first bias voltage line 4 on the base substrate 1 is located between the orthographic projections of the pixel unit P and the second signal line 17 (data line) on the base substrate 1. In this way, the first bias voltage line 4 as a whole is moved outside the photoelectric conversation device 3, only the sixth via V6 overlaps with the photoelectric conversation device 3, in this way, shielding of the first bias voltage line 4 on a sensing area of the photoelectric conversation device 3 may be reduced, the pixel filling rate is improved, and then the sensitivity and the signal to noise ratio of the detection substrate may be further improved.

It needs to be illustrate that the film layer position relationship between the first conductive layer 6, the second conductive layer 12, the second bias voltage line 7 and the shielding layer 13 and patterns of film layers in the structure shown in FIG. 8 are the same as the structure shown in FIG. 5, and the via connection arrangement mode between the first conductive layer 6, the second conductive layer 12, the second bias voltage line 7 and the shielding layer 13 is the same as that in FIG. 7.

During specific implementation, as shown in FIG. 5, FIG. 6, FIG. 7 and FIG. 8, the peripheral area BB at the two ends of the extension direction of the second signal lines 17 (data lines) is indicated as a top frame and a bottom frame, and the peripheral area BB at the two ends of the extension direction of the first signal lines 16 (gate lines) is indicated a left frame and a right frame. As such, the first conductive layer 6 and the second bias voltage line 7 are electrically connected in the upper frame in FIG. 5, FIG. 6, and FIG. 8, which may be electrically connected in the lower frame, or in both the top frame and the bottom frame. The first conductive layer 6 and the second bias voltage line 7 are electrically connected in the left frame in FIG. 7, which may be electrically connected in the right frame, or in both the left frame and the right frame.

During specific implementation, as shown in FIG. 5, FIG. 6, FIG. 7 and FIG. 8, the orthographic projection of the first bias voltage line 4 on the base substrate 1 does not overlap with the orthographic projection of the compensation electrode 52 on the base substrate 1, or they may overlap with each other. The size of the compensation electrode 52 is designed according to the size of the compensation capacitor 5 to be added.

Figure 15:
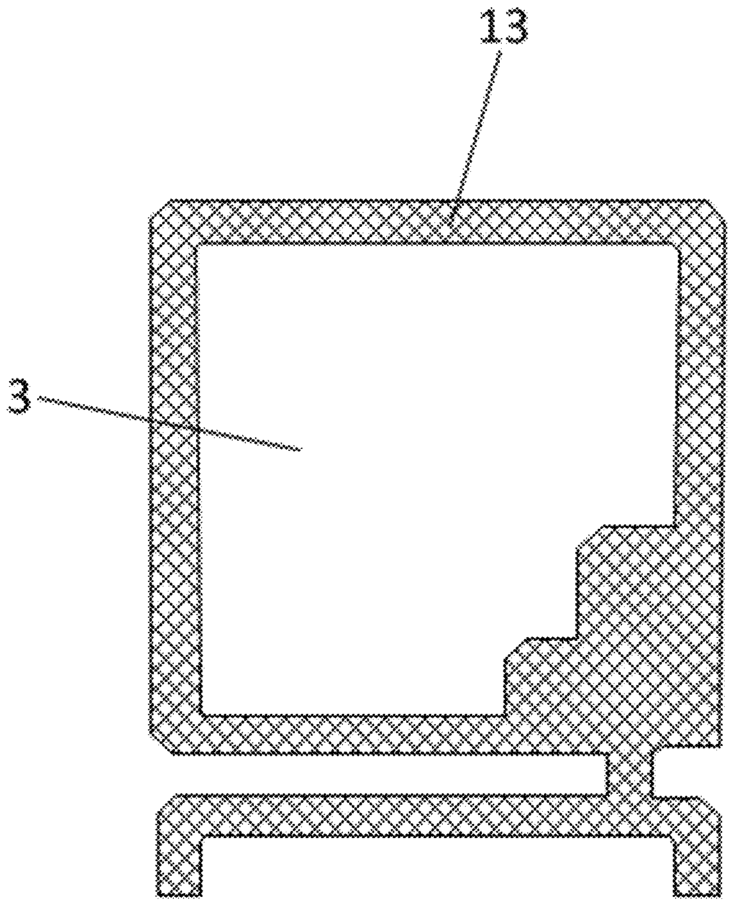
FIG. 15 shows a partial view of a schematic planar diagram of a shielding layer in FIG. 5, FIG. 6, FIG. 7 and FIG. 8.

During specific implementation, as shown in FIG. 5, FIG. 6, FIG. 7 and FIG. 8, in the peripheral area BB, the shielding layer 13 needs to be provided with the hollow-out structure in an area where the shielding layer 13 overlaps the data lines or gate lines to reduce the overlapping capacitance of the shielding layer 13 and the data lines or the gate lines. In the detection area AA, since the scintillator layer needs to be evaporated after the shielding layer 13, the shielding layer 13 generally is an ITO layer, in order to improve an evaporation effect of the scintillator layer, the shielding layer 13 above the photoelectric conversation device 3 needs to be removed, thus the shielding layer 13 is only reserved on the periphery of the photoelectric conversation device 3, as shown in FIG. 15, which is a partially schematic diagram of the shielding layer 13 in FIG. 5, FIG. 6, FIG. 7 and FIG. 8.

Figure 16:
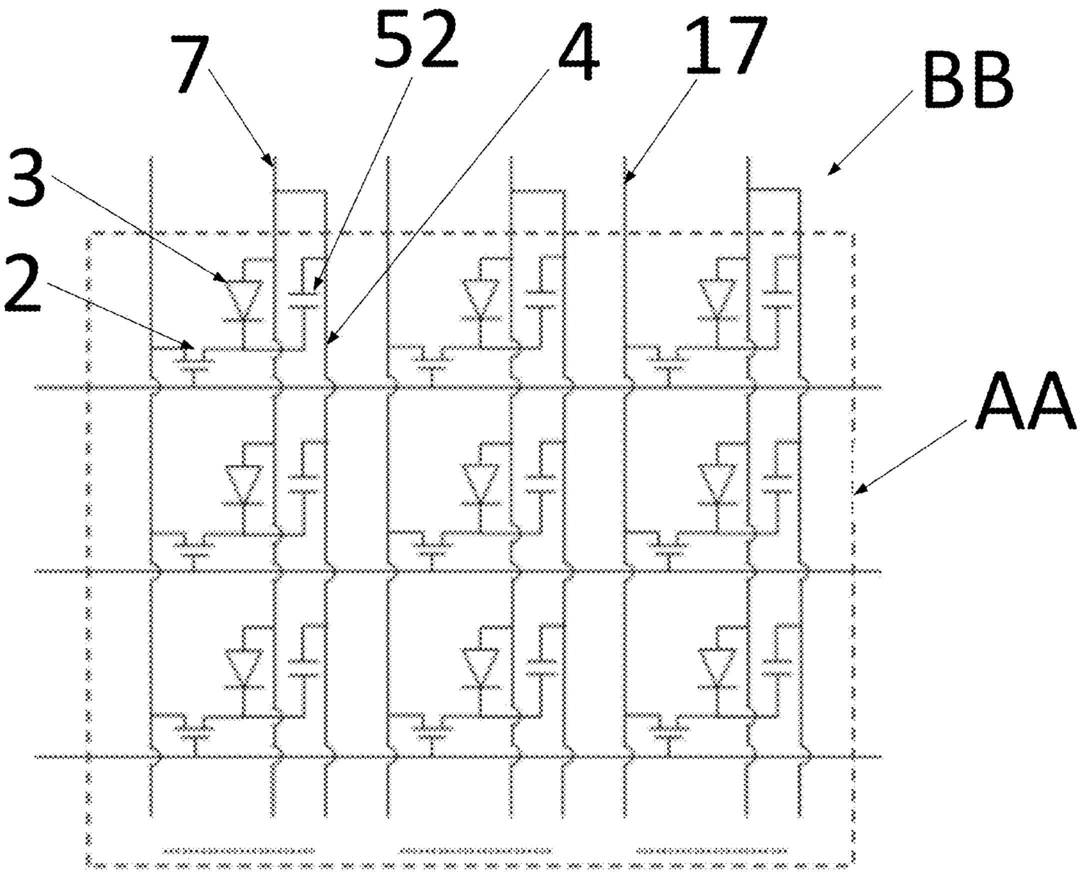
FIG. 16 shows a schematic diagram of an equivalent circuit of the structure with a compensation capacitor added shown in FIG. 2 to FIG. 8 of embodiments of the disclosure.

As shown in FIG. 16, FIG. 16 is a schematic diagram of an equivalent circuit of the structure with the compensation capacitor 5 added in FIG. 2 to FIG. 8 of embodiments of the disclosure. It can be seen that the second bias voltage line 7 is electrically connected with the compensation electrode 52 in the peripheral area BB.

In conclusion, according to the added compensation capacitor in the detection substrate provided by the embodiment of the disclosure, one electrode is reused as the bottom electrode of the photoelectric conversation device, and the other electrode (compensation electrode) is arranged in the same layer as the source electrode or gate electrode of the thin film transistor, so that the quantity of Mask and technological processes are not additionally added. The size of the compensation capacitor may be flexibly adjusted through the size of the overlapping area of the compensation electrode and the bottom electrode, meanwhile, the thickness of the insulating layer (generally is SiNx or SiO2 or intrinsic a-Si or organic resin materials, etc.) between the compensation electrode and the bottom electrode and dielectric constants may also be adjusted through the technology, so as to also achieve the purpose of adjusting the size of the compensation capacitor. The compensation electrode of the compensation capacitor is electrically connected with the first bias voltage line not in the pixel unit via a punching mode, but is electrically connected with the first bias voltage line in the peripheral area by setting an adaption conductive film. The technical difficulty of punching on the periphery of the detection area is much lower than that in the detection area, the punching space in the pixel unit is further saved, and a further loss of the filling rate of the photoelectric conversation device of high resolution products is avoided.

Based on the same inventive concept, an embodiment of the disclosure further provides a flat panel detector, including the above detection substrate provided by the embodiment of the disclosure. Since the principle of the flat panel detector solving the problem is similar to that of the above-mentioned detection substrate, the implementation of the flat panel detector may refer to the implementation of the above-mentioned detection substrate, and repetitions are omitted.

The embodiments of the disclosure provide the detection substrate and the flat panel detector, the compensation capacitor with the bottom electrode shared with the photoelectric conversation device is formed in the pixel unit, the compensation capacitor and a storage capacitor formed by the top electrode and the bottom electrode of the photoelectric conversation device is equivalent to be in parallel connection, so that the capacitance of the photoelectric conversation device is increased, and therefore, the disclosure can increase the charge storage capacity of the pixel unit and improve the dynamic range of the output signal of the flat panel detector on the premise of not losing the resolution. In addition, the compensation electrode of the compensation capacitor is electrically connected with the first bias voltage line not in the pixel unit, rather, the first conductive layer arranged in the same layer as and electrically connected with the compensation electrode as well as the second bias voltage line arranged in the same layer as and electrically connected with the first bias voltage line are arranged in the peripheral area, then the first conductive layer is electrically connected with the second bias voltage line in the peripheral area, it is equivalent to that the compensation electrode is electrically connected with the first bias voltage line in the peripheral area, so that the punching space in the pixel unit is saved, and the further loss of the filling rate of the photoelectric conversation device of the high resolution products is avoided.

Although the preferred embodiments of the disclosure have been described, those skilled in the art can make additional modifications and variations on these embodiments once they know the basic creative concept. Therefore, the appended claim intends to be explained as including the preferred embodiments and all modifications and variations falling within the scope of the disclosure.

Apparently, those skilled in the art can make various modifications and variations on the embodiments of the disclosure without departing from the spirit and scope of the embodiments of the disclosure. In this way, if these modifications and variations of the embodiments of the disclosure fall within the scope of the claims of the disclosure and their equivalent art, the disclosure also intends to include these modifications and variations.

What is claimed is:

1. A detection substrate, comprising a base substrate with a detection area and a peripheral area outside the detection area, and a plurality of pixel units distributed in an array in the detection area;

wherein each pixel unit comprises:

a thin film transistor at a side of the base substrate;

a photoelectric conversion device at a side of the thin film transistor facing away from the base substrate, wherein a bottom electrode of the photoelectric conversion device is electrically connected with a source electrode of the thin film transistor;

a first bias voltage line at a side of the photoelectric conversion device facing away from the base substrate, wherein the first bias voltage line is electrically connected with a top electrode of the photoelectric conversion device; and a compensation capacitor, comprising: the bottom electrode, a dielectric layer at a side of the bottom electrode facing the base substrate, and a compensation electrode at a side of the dielectric layer facing the base substrate;

wherein, in the peripheral area, the detection substrate comprises: a plurality of first conductive layers arranged in a same layer as the compensation electrode, and a second bias voltage line arranged in a same layer as the first bias voltage line;

wherein at least one first conductive layer is electrically connected with at least one column of compensation electrodes, the second bias voltage line is electrically connected with the first bias voltage line, and the first conductive layer is electrically connected with the second bias voltage line.

2. The detection substrate according to claim 1, wherein in the peripheral area, the detection substrate further comprises a plurality of spaced second conductive layers between a layer where the first conductive layers are located and the second bias voltage line;

wherein the second conductive layer is arranged in a same layer as the bottom electrode, and the first conductive layer is electrically connected with the second bias voltage line through the second conductive layer.

3. The detection substrate according to claim 2, wherein a column of compensation electrodes is correspondingly provided with at least one first conductive layer and at least one second conductive layer;

a first overlapping area is provided between the first conductive layer, the second conductive layer and the second bias voltage line, and the first overlapping area comprises at least one via area;

the first conductive layer is electrically connected with the second conductive layer through the at least one via area, and the second conductive layer is electrically connected with the second bias voltage line through the at least one via area.

4. The detection substrate according to claim 3, further comprising:

an interlayer insulating layer between the thin film transistor and the photoelectric conversion device;

a planarization layer between the photoelectric conversion device and the first bias voltage line; and a first passivation layer between the planarization layer and the first bias voltage line;

wherein, the via area comprises at least one first via passing through the interlayer insulating layer, at least one second via passing through the first passivation layer, and at least one third via passing through the planarization layer; and in a same via area, an orthographic projection of the second via on the base substrate is located within a scope of an orthographic projection of the third via on the base substrate, the first conductive layer is electrically connected with the second conductive layer through the first via, and the second conductive layer is electrically connected with the second bias voltage line through the second via and the third via.

5. The detection substrate according to claim 4, further comprising:

a second passivation layer between the photoelectric conversion device and the planarization layer; wherein the second via passes through the second passivation layer and the first passivation layer.

6. The detection substrate according to claim 4, further comprising: a shielding layer at a side of the first bias voltage line facing away from the base substrate, and a third passivation layer between the first bias voltage line and the shielding layer;

wherein, the shielding layer covers the first overlapping area;

each via area further comprises at least one fourth via passing through the third passivation layer, and the shielding layer is electrically connected with the second bias voltage line through the fourth via.

7. The detection substrate according to claim 6, wherein, in the same via area, an orthographic projection of the first via on the base substrate is located within the scope of the orthographic projection of the third via on the base substrate:

the first via and the second via are alternately arranged in an extension direction of the first overlapping area; and the orthographic projection of the third via on the base substrate is located within a scope of an orthographic projection of the fourth via on the base substrate.

8. The detection substrate according to claim 7, wherein an aperture of the first via is larger than an aperture of the second via.

9. The detection substrate according to claim 6, wherein, in the same via area, the orthographic projection of the first via on the base substrate does not overlap with the orthographic projection of the third via on the base substrate, and the orthographic projection of the fourth via on the base substrate does not overlap with the orthographic projection of the third via on the base substrate.

10. The detection substrate according to claim 9, wherein the first vias, the second vias and the fourth vias all are arranged in an array.

11. The detection substrate according to claim 3, wherein the first overlapping area further comprises a transmitting area spaced from the via area, the transmitting area comprises a first through hole passing through the first conductive layer, a second through hole passing through the second conductive layers and a third through hole passing through the second bias voltage line, wherein the first through hole, the second through hole and the third through hole are sleeve holes.

12. The detection substrate according to claim 11, wherein areas of orthographic projections of the first through hole, the second through hole and the third through hole on the base substrate decrease successively.

13. The detection substrate according to claim 11, wherein the via areas and the transmitting areas are alternately arranged.

14. The detection substrate according to claim 4, wherein the thin film transistor comprises a gate electrode, a gate insulating layer, an active layer, a source electrode and a drain electrode arranged in stack;

the compensation electrode is arranged in a same layer as the source electrode, and the dielectric layer is the interlayer insulating layer; or the compensation electrode is arranged in a same layer as the gate electrode, and the dielectric layer comprises the interlayer insulating layer and the gate insulating layer; and the first via further passes through the gate insulating layer.

15. The detection substrate according to claim 14, wherein the detection area further comprises first signal lines and second signal lines insulated and intersecting with each other, each second signal line is electrically connected with drain electrodes of thin film transistors in two adjacent columns of pixel units, and gate electrodes of the thin film transistors in each row of pixel units are electrically connected with either of two first signal lines at two sides of the each row of pixel units alternately;

wherein, two columns of compensation electrodes between every two adjacent second signal lines are in a group, and a compensation line is arranged at a gap between two corresponding adjacent columns of pixel units in each group;

the compensation line extends to the peripheral area, and the compensation line is arranged in the same layer as compensation electrodes at two sides of the compensation line and is electrically connected with the compensation electrodes at the two sides of the compensation line; and each group of compensation electrodes correspond to two first conductive layers.

16. The detection substrate according to claim 14, wherein the detection area further comprises first signal lines and second signal lines insulated and intersecting with each other, each second signal line is electrically connected with drain electrodes of thin film transistors in one column of pixel units, and each first signal line is electrically connected with gate electrodes of the thin film transistors in one row of pixel units;

wherein, a plurality of compensation electrodes arranged in an arrangement direction of via areas are connected in series successively, and the first conductive layer is electrically connected with a compensation electrode closest to the first conductive layer among the compensation electrodes connected in series.

17. The detection substrate according to claim 15, wherein the first signal line or the second signal line extends to the peripheral area, an overlapping area between orthographic projections of the second bias voltage line and the first signal line or the second signal line on the base substrate comprises a plurality of first hollow-out structures arranged at intervals, and an overlapping area between orthographic projections of the shielding layer and the first signal line or the second signal line on the base substrate comprises a plurality of second hollow-out structures arranged at intervals;

wherein an orthographic projection of the first hollow-out structure on the base substrate partially overlaps with an orthographic projection of the second hollow-out structure on the base substrate.

18. The detection substrate according to claim 1, wherein at least one of following is comprised:

at a position where the first bias voltage line is connected with the second bias voltage line, a width of the second bias voltage line is larger than a width of the first bias voltage line; or at a position where the first conductive layer is connected with the compensation electrode, a width of the first conductive layer is larger than a width of the compensation electrode.

19. The detection substrate according to claim 1, wherein at least one of following is comprised:

an orthographic projection of the first bias voltage line on the base substrate mutually overlaps with an orthographic projection of the pixel unit on the base substrate; or an orthographic projection of the first bias voltage line on the base substrate is located between the orthographic projection of the pixel unit on the base substrate pixel unit and the orthographic projection of the second signal line on the base substrate.

20. A flat panel detector, comprising the detection substrate according to claim 1.

* * * * *